(12) United States Patent  
Znamensky et al.

(10) Patent No.: US 7,195,026 B2
(45) Date of Patent: Mar. 27, 2007

(54) MICRO ELECTROMECHANICAL SYSTEMS FOR DELIVERING HIGH PURITY FLUIDS IN A CHEMICAL DELIVERY SYSTEM

(75) Inventors: Dmitry Znamensky, Darien, IL (US); Alan Zdunek, Chicago, IL (US)

(73) Assignee: American Air Liquide, inc.

( * ) Notice: Subject to any disclaimer, the term of this patent is extended or adjusted under 35 U.S.C. 154(b) by 463 days.

(21) Appl. No.: 10/733,761

(22) Filed: Dec. 12, 2003

(65) Prior Publication Data

US 2004/0159351 A1 Aug. 19, 2004

Related U.S. Application Data

(60) Provisional application No. 60/436,731, filed on Dec. 27, 2002, provisional application No. 60/436,732, filed on Dec. 27, 2002.

(51) Int. Cl.
  *F16K 11/00* (2006.01)
(52) U.S. Cl. .................... 137/15.04; 137/240
(58) Field of Classification Search ........... 137/240, 137/15.04, 15.01, 884
  See application file for complete search history.

(56) References Cited

U.S. PATENT DOCUMENTS

| 3,725,010 A | 4/1973 | Penhast |
| 3,819,305 A | 6/1974 | Klochemann et al. |
| 4,821,997 A | 4/1989 | Zdeblick |
| 5,069,419 A | 12/1991 | Jerman |
| 5,325,880 A | 7/1994 | Johnson et al. |
| 5,333,381 A | 8/1994 | Gelardi et al. |
| 5,417,235 A | 5/1995 | Wise et al. |
| 5,465,766 A | 11/1995 | Siegele et al. |
| 5,529,279 A | 6/1996 | Beatty et al. |
| 5,542,821 A | 8/1996 | Dugan |
| 5,647,574 A | 7/1997 | Mettner et al. |
| 5,865,417 A | 2/1999 | Harris et al. |
| 6,082,185 A | 7/2000 | Saaski |
| 6,168,948 B1 | 1/2001 | Anderson et al. |
| 6,264,064 B1 | 7/2001 | Birtcher et al. |
| 6,423,536 B1 | 7/2002 | Jovanovich et al. |
| 6,523,567 B2 * | 2/2003 | Satou et al. ........... 137/240 |
| 6,590,267 B1 | 7/2003 | Goodwin-Johansson et al. |
| 6,592,098 B2 | 7/2003 | Kao et al. |
| 7,051,749 B2 * | 5/2006 | Wodjenski et al. ...... 137/15.04 |

(Continued)

FOREIGN PATENT DOCUMENTS

EP 0 829 649 A2 3/1998

(Continued)

OTHER PUBLICATIONS

MEMS-Flow TM Model 9900 User Manual, Document: RM9719 Rev A.2b, 2001, 21 pages, Redwood MicroSystems, Inc., Menlo Park, CA.

(Continued)

*Primary Examiner*—Kevin Lee
(74) *Attorney, Agent, or Firm*—Christopher J. Cronin

(57) ABSTRACT

Complex fluidic micro electromechanical systems (MEMS) are incorporated into high purity chemical delivery systems, while maintaining valve sealing integrity, quality and performance of the system. In particular, fluidic MEMS systems are incorporated into high purity chemical delivery systems for semiconductor fabrication processes.

25 Claims, 18 Drawing Sheets

U.S. PATENT DOCUMENTS

2001/0053337 A1    12/2001    Doktycz et al.
2002/0187560 A1    12/2002    Pezzuto et al.

FOREIGN PATENT DOCUMENTS

WO    WO 01 93998 A2    12/2001
WO    WO 02 055188 A2    7/2002

OTHER PUBLICATIONS

Albert K. Henning, et al., Performance of Mems-Based Gas Distribution and Control Systems for Semiconductor Processing, 1998, 8 pages, Proceedings, SEMICON West Workshop on Gas Distribution, Mountain View, CA.

MEMS-Flow TM Ultra-Clean Shut-Off Valve Preliminary Report, Sep. 2000, 16 pages, Redwood Microsystems, Inc., Menlo Park, CA.

Alan Lewis et al., Fluid Dispensing Capabilities for Assembly of MEMs, 2 pages, Symtek, Carlsbad, CA.

Michael J. Muehlbauer et al., Applications and Stability of a Thermoelectric Enzyme Sensor, Sensors and Actuators B, 2 (1990); pp. 223-232.

Sunniva R. Collins, Stainless Steel for Semiconductor Applications, 39th MWSP Conf. Proc., ISS, vol. XXXV, 1998, pp. 607-619.

H.A. Stone, Microfluidics: Basic Issues, Applications, and Challenges, vol. 47, No. 6, AIChE Journal, pp. 1250-1254, Jun. 2001.

Holger Lowe, et al., Microreactors. Prospects already achieved and possible misuse, Pure Appl. Chem., vol. 74, No. 12, pp. 2271-2276, 2002.

V. Hessel, et al., Micro chemical processing at IMM—from pioneering work to customer-specific services, Lab Chip, 2002, 2, 14N-21 N, The Royal Society of Chemistry 2002.

Bonnie L. Gray et al., Microchannel Platform for the Study of Endothelial Cell Shape and Function, Biomedical Microdevices: 4:1, 9-16, 2002 Kluwer Academic Publishers, The Netherlands.

J. Zachary Hilt et al., Ultrasensitive Biomems Sensors Based on Microcantilevers Patterned with Environmentally Responsive Hydrogels, Biomedical Microdevices 5:3, pp. 144-184, 2003, Klumer Academic Publishers, The Netherlands.

J.M. Girard, et al., Contamination—free delivery of advanced precursors for new materials introduction in IC manufacturing, Future FAB International Issue 13—Contamination Control , pp. 157-162, Jul. 2002.

Patrick Cooley, et al., Applications of Ink-Jet Printing Technology to BioMEMS and Microfluidic Systems, Microfluidics and Biomems, Proceedings of SPIEVA, 4560 (2001), pp. 177-188.

Guide for Welding Stainless Steel Tubing for Semiconductor Manufacturing Applications, Semi F3-94 (Withdrawn 1103) 1990, 2003, pp. 1-6.

Jeffrey P. Baker, et al., Design and Development of a Color Thermal Inkjet Print Cartridge, Hewlett-Packard Journal Aug. 1988.

Phillip W. Barth, Silicon Microvalves for Gas Flow Control, Transducers '95—Eurosensors IX, 1995, pp. 276-279.

Andrew Campitelli, et al., BioMEMS: Marrying Ics and biotech, Solid State Technology, Jul. 2002, pp. 87-92.

Joseph Cestari, et al., The Next Step in Process Gas Delivery: a Fully Integrated System, Semiconductor International, Jan. 1997, pp. 79-86.

Albert K. Henning, et al., Evaluating the use of MEMS-based gas and fluid delivery systems, MICRO, Jul./Aug. 1998, 7 pages.

International Search Report for PCT/IB 03/06199.

\* cited by examiner

MICRO ELECTROMECHANICAL SYSTEMS FOR DELIVERING HIGH PURITY FLUIDS IN A CHEMICAL DELIVERY SYSTEM

CROSS REFERENCE TO RELATED APPLICATIONS

This application claims priority from the following U.S. Provisional Patent Application Ser. Nos.: 60/436,731, entitled "Integrated Purge For MEMS-Based Liquid Mass Flow Controller and/or Meter", filed Dec. 27, 2002; and 60/436,732, entitled "Reverse Orientation of Micro-Valves in Gas/Liquid Chemical Delivery Systems", filed Dec. 27, 2002. The disclosures of these provisional patent applications are incorporated herein by reference in their entireties.

BACKGROUND OF THE INVENTION

1. Technical Field

The present invention pertains to miniaturized chemical delivery systems. In particular, the present invention pertains to micro electromechanical systems for delivery of high purity chemicals to a manufacturing or other process.

2. Discussion of the Related Art

Micro electromechanical systems, or MEMS, are miniature systems used in a variety of applications. In particular, fluidic MEMS are used to transport and dispense gaseous and/or liquid fluid media for a number of applications. Fluidic MEMS include a variety of different components, including miniaturized valves, nozzles, pumps, orifices, sensors (e.g., pressure and/or temperature), reservoirs, etc. that include micro-channels sized on the order of microns or even nanometers. These MEMS components are typically manufactured utilizing one or a combination of conventional manufacturing techniques, such as bulk or surface micro-machining, high-aspect ratio micro-machining (HARM), and LIGA (referring to the German process of Lithographie/Galvanoformung/Abformung, or lithography/electroplating/molding).

The most advanced implementations of fluidic MEMS to date are in inkjet printer heads and micro-sensors utilized for biological and chemical analysis systems. The application of fluidic MEMS is highly desirable in other fluid distribution systems, such as high purity gas and liquid delivery and distribution systems for semiconductor fabrication and processing applications.

A number of different high purity liquid chemicals, including a wide spectrum of aqueous and organic solutions, are utilized for various production processes, such as chemical precursors for growing thin films in semiconductor and optics manufacturing (e.g., metal-organic compounds in solvents such as isopropanol, octane, tetrahydrofuran, toluene, etc.), as well as reactants, carriers and/or analytes in chemical, biochemical and pharmaceutical synthesis and analysis. Many of these chemicals can be easily contaminated (e.g., by exposure to air, particulate material, moisture, etc.) in the system distribution lines, resulting in reduced production yields or the formation of solids that may become embedded within and even clog distribution lines. In semiconductor manufacturing, for example, many metal-organic precursor chemicals react with oxygen and moisture, producing solid deposits that contaminate the distribution lines. In addition, many of the chemicals utilized in the distribution lines are toxic and/or present a fire hazard or explosion risk. Therefore, during long inactive periods when supply containers or sections of the distribution lines are disconnected from other parts of the system, the distribution lines often need to be subjected to an inert gas, a vacuum, and/or a liquid solvent to purge the lines of residual chemicals disposed therein, and to prevent the escape of chemicals into the surrounding atmosphere and also the interior of the distribution lines from intrusion of ambient air or other contaminants.

The delivery of chemicals within the high purity delivery system can be accomplished utilizing pressurization, pumping, and/or gravity. An inert gas, such as helium, is utilized to pressurize the chemicals in the distribution lines as well as chemical storage sources for supplying chemicals to the distribution lines. In order to provide a continuous delivery of one or more chemicals through the delivery system, often two or more containers are provided in series or in parallel with the distribution lines. When one container is empty, another container is brought on-line to continue supply of chemicals while the empty container is refilled.

While it is highly desirable to provide fluidic MEMS for high purity chemical distributions systems such as those noted above, the readily available and most commonly used equipment utilized for such distribution systems are conventional high purity valve and pipe fitting products, such as valves, VCRs, compression, flared, and pipe thread products commercially available from Swagelok (Solon, Ohio, e.g., NUPRO® products) and MKS Instruments, Inc. (Andover, Mass.). The conventional high purity fluidic components are adequate for many applications when a moderate number of components are necessary and higher chemical flows and/or pressures are required. However, such conventional components are less desirable when system size becomes an issue, particularly, when dealing with very low volumetric flows, e.g., 20 cubic centimeters per minute (ccm) or less. As the number of components (e.g., valves, sensors, mass flow controllers, etc.) increases, integration of conventional connectors and tubing into complex chemical distribution systems, not to mention conventional electronics control blocks (typically controlled by conventional programmable logic controllers), becomes cumbersome and quite expensive as well as requiring additional floor space to house the system. Further, these distribution systems are difficult to operate and control, as most individual components require dedicated control lines (electrical or pneumatic) and are more prone to contamination due to the increased system volume and the increasing difficulties associated with cleaning, purging and evacuating distribution lines within the system.

The implementation of MEMS into high purity systems would eliminate many of the problems associated with the bulkiness, contamination problems, increased expense and excessive size of complex fluid delivery systems utilizing conventional non-MEMS components. However, despite the advantages associated with employing MEMS, there has been a reluctance to utilize MEMS in high purity chemical distribution systems due to certain problems associated with MEMS components. In particular, MEMS shut-off valves, an important component in any fluid distribution system design, presently do not have sufficient sealing characteristics that would render such valves useful for complex distribution systems.

One of the most reliable and highly developed MEMS shut-off valves that presently exists is a cantilever-type valve, an example of which is the MEMS-Flow™ Ultra-Clean Shut-Off Valve commercially available from Redwood Microsystems, Inc. (Menlo Park, Calif.). A detailed disclosure of the MEMS-Flow™ valve of Redwood Microsystems, Inc. is described in U.S. Pat. No. 5,865,417, the disclosure of which is incorporated herein by reference in its entirety. In particular, this cantilever-type valve is formed by a micromachining process on a die or block and includes a cantilevered valve element and input and output channels disposed on in the block. In a normally closed position, the cantilevered valve element blocks an exit port within the valve to prevent fluid communication in a direction from the input channel to the output channel of the valve. The valve element is moved by a fluid filled membrane that flexes in response to energy inputs that heat the fluid within the membrane, forcing the valve element away from its sealing engagement so as to unblock the exit port and permit fluid to flow through the valve.

The problem associated with the cantilever-type design for MEMS shut-off valves is that they possess an asymmetrical sealing characteristic. In particular, these types of shut-off valves are "directional" and have a different leakage rate depending upon the direction of the pressure differential across the valve. In a normally closed position (i.e., the cantilever valve element blocks the exit port), leakage across the valve seal differs for the same pressure differential applied in the forward flow (i.e., inlet channel to outlet channel) orientation of the valve vs. the reverse flow (i.e., outlet channel to inlet channel) orientation.

In contrast, conventional shut-off valves, such as the Swagelok series of diaphragm shut-off valves, are less susceptible to valve leakage due to the development of positive and negative pressure differentials during system operation. Typical sealing requirements for shut-off valves used in semiconductor electronics manufacturing equipment is a leakage rate of no greater than about $1 \times 10^{-9}$ Atm (measured with He)×standard cubic centimeters per second (i.e., Atm(He)*scc/sec). The cantilever-type shut-off valve design can yield a much larger leakage rate, particularly when negative pressure differentials develop across the valve approaching 20 psi (1.36 Atm) and greater.

Further, the integration of too many MEMS components into a single die may result in a reduced reliability and flexibility of the distribution system, where undesirable interactions or interference may occur between different sensors or actuators associated with the die.

In addition, the scaling of common types of fluid controllers into MEMS components can present problems. For example, the use of conventional MEMS mass flow controllers often becomes unreliable and presents quality issues, particularly in high purity chemical distribution applications, due to partial or even complete clogging of microchannels or orifices that can occur during use of the mass flow controller. Frequently, such clogging and contamination problems occur when operation of the mass flow controller is halted for a period of time, resulting in residual and stagnant chemical fluid within the system block. Due to the extremely small internal dimensions and internal volume of the MEMS micro-channels, clogging of these channels with stagnant chemicals (e.g., due to particulates in the chemicals, precipitation of the chemicals, etc.) can occur with only a short interruption in flow through the flow controller block. The clogging problem can be minimized by scaling up the dimensions of the MEMS components. However, enlarging the size of the MEMS system diminishes the advantages associated with utilizing MEMS technology.

Thus, the integration of MEMS valves and other MEMS components into complex and miniature high purity fluid distribution systems is difficult and is not as simple as combining conventional, non-MEMS components together to form a particular chemical flow configuration.

OBJECTS AND SUMMARY OF THE INVENTION

Accordingly, it is an object of the present invention is to provide a chemical distribution system employing MEMS components and having suitable valve sealing characteristics.

It is another object of the present invention to provide a chemical distribution system employing MEMS components and having a high degree of reliability and enhanced performance.

It is a further object of the present invention to provide a complex high purity chemical distribution system employing MEMS components disposed on a plurality of system blocks that are in fluid communication with each other.

The aforesaid objects are achieved individually and/or in combination, and it is not intended that the present invention be construed as requiring two or more of the objects to be combined unless expressly required by the claims attached hereto.

According to the present invention, a fluid distribution system includes a first valve and a second valve. Each of the first and second valves includes a first channel in fluid communication with a second channel and a sealing member disposed between the first and second channels to selectively provide an asymmetric fluidic seal between the first and second channels such that, when a pressure differential is equally applied in opposing directions between the first and second channels, a fluid leakage rate across the sealing member is higher when fluidic pressure within the second channel is greater than fluidic pressure in the first channel in comparison to when fluidic pressure in the first channel is greater than fluidic pressure in the second channel. The first and second valves are implemented in the system in opposing orientations with respect to each other such that, when the second channel of the first valve serves as an outlet of the first valve, the second channel of the second valve serves as an inlet of the second valve. Preferably, at least a portion of each of the first and second valves is formed in a block and is in fluid communication with at least one channel disposed in the block and extending between the first and second valves. Thus, the system provides a combined or dual MEMS valve combination that renders a symmetric seal across the two valves.

In another aspect of the present invention, a fluid distribution system includes a fluid supply source, a block including at least one fluid distribution channel disposed within the block, an inlet port in fluid communication with the fluid supply source to receive and deliver a fluid in a first direction from the inlet port to an outlet port of the block via the at least one fluid distribution channel, and a valve at least partially formed within the block and in fluid communication with the at least one fluid distribution channel. The valve further includes a sealing member that selectively provides an asymmetric fluid seal such that, when a pressure differential is equally applied across the valve in the first direction and in a second direction that opposes the first direction, a fluid leakage rate across the sealing member is higher when fluid flows in the first direction in comparison to when fluid flows in the second direction.

In still another aspect of the present invention, a fluid distribution system includes a first block with a pressurization channel disposed within the first block, a pressure sensor at least partially formed within the first block and in fluid communication with the pressurization channel, and a plurality of valves at least partially formed in the first block and in fluid communication with the pressurization channel to facilitate pressurizing of a pressurization fluid entering the pressurization channel from a pressurization supply source to a selected pressure prior to delivery of the pressurization fluid to a first process fluid supply source. The system further includes a second block with a network of delivery channels disposed within the second block, and a plurality of valves at least partially formed within the second block and in fluid communication with the network of delivery channels to facilitate a supply of a process fluid to a delivery site from at least one of the first process fluid supply source and a second fluid supply source.

In a further aspect of the present invention, an integrated flow meter and internal purge system includes a first shut-off valve in fluid communication with a main flow path of the system to selectively control input of a fluid into the system from a fluid supply source, a second shut-off valve in fluid communication with the main flow path to selectively control output of the fluid from the system to a delivery site, and a flow meter. The flow meter includes a sensor in fluid communication with the main flow path and disposed between the first and second shut-off valves, and a control valve in fluid communication with the main flow path and disposed between the first and second shut-off valves. The sensor measures a physical property of the fluid flowing through the main flow path, and the control valve selectively controls the flow rate of the fluid flowing through the main flow path based upon measurements of the sensor.

The system further includes a purge delivery line with a purge inlet flow path in fluid communication with the main flow path and a purge inlet port to facilitate delivery of a purge fluid from a purge fluid supply source to the purge inlet flow path. The purge fluid inlet flow path is disposed between the first shut-off valve and the flow meter and further includes a third shut-off valve to selectively control the flow of purge fluid from the purge fluid supply source into the purge inlet flow path. A purge outlet flow path is in fluid communication with the main flow path and a purge outlet port to facilitate delivery of a purge fluid from the purge outlet flow path to a purge fluid collection site. The purge outlet flow path is disposed between the flow meter and the second shut-off valve and further includes a fourth shut-off valve to selectively control the flow of purge fluid from the purge outlet flow path to the purge fluid collection site. Each of the main flow path, the shut-off valves, flow meter and purge fluid delivery line can be at least partially formed within a block, so as to yield a MEMS system.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
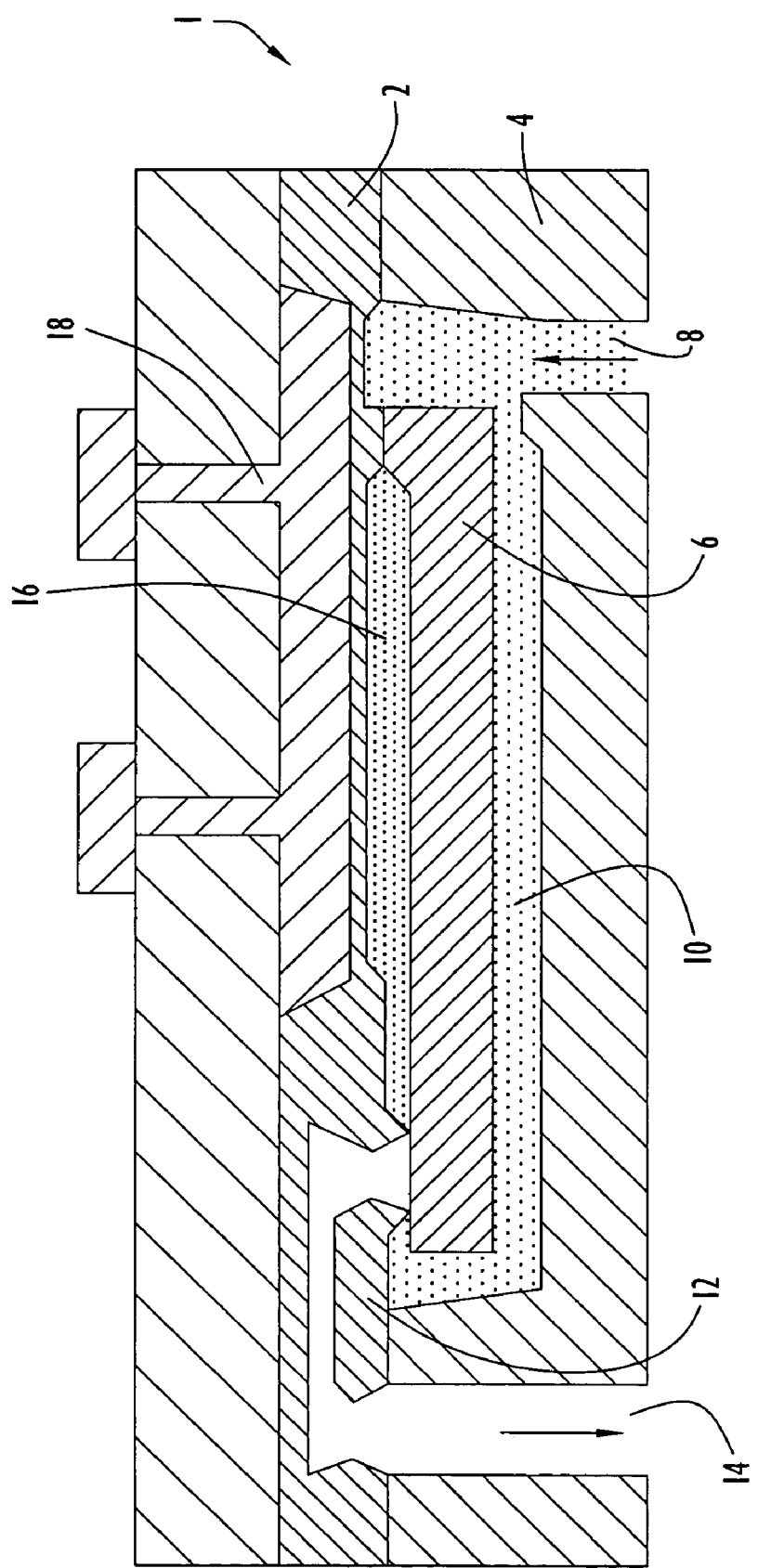
FIG. 1 is a cross-sectional view of a "directional" MEMS shut-off valve employed in high purity distribution systems in accordance with the present invention.

High purity fluid micro electromechanical systems (MEMS) are described that are capable of delivering liquid and/or gas streams to a delivery site while maintaining a high level of purity of the streams. The MEMS include a variety of miniature fluid processing components, such as valves, sensors (e.g., pressure, temperature, flow, galvanic, acoustic, optic, etc.), orifices, pumps, mixers, reservoirs, etc., that are disposed on one or more dies or blocks. Each of the MEMS components can be any conventional, commercially available or other suitable type. Examples of manufacturers of commercially available MEMS components (e.g., valves, pressure/temperature sensors, mass flow controllers, etc.) are Redwood Microsystems, Inc. (Menlo Park, Calif.), Analog Devices Inc. (Norwood, Mass.), and IC Mechanics, Inc. (Pittsburgh, Pa.).

Typically, MEMS components are formed on one or more dies or blocks utilizing any one or a combination of MEMS manufacturing techniques including, without limitation, lithography, etching, wet anisotropic etching, electroplating, micro-machining (e.g., bulk micro-machining, surface micro-machining, and high aspect ratio micro-machining or HARM), and combinations there of (e.g., LIGA or lithography, electroplating and molding). These techniques facilitate the formation of thin layers on the order of microns on the die or block to form the miniaturized MEMS component. Any one or plural (i.e., two or more) MEMS components can be formed on a single block. The die or block is simply a suitable substrate of sufficient thickness to facilitate formation of channels and/or portions of a particular MEMS component (e.g., by any of the previously described processes). The MEMS components described herein, including the die or block and any other portions forming the components, may be constructed of any suitable material including, without limitation, metals such as stainless steel, silicon, polymers, pyrex, alumina, ceramics, and any selected combinations thereof. In particular, two or more MEMS components (e.g., a valve and sensor) that are implemented on a block are in fluid communication with each other via at least one micro-channel disposed within the block.

Any single or combination of two or more blocks containing any combination of MEMS components can be fluidly connected to provide a complex MEMS fluid distribution system. MEMS components may be integrated into separate blocks so as to organize the blocks by functional or geometric design. For example, separate MEMS blocks may be designed for functions such as pressurization of fluid delivered from a supply tank, flushing of solvent in the system, evacuation and waste handling, providing precise pressure and flow control (e.g., a mass flow controller MEMS block), etc. Alternatively, any suitable number of MEMS components arranged in different functional groups may be arranged on a single block. Further, conventional valves, fluid lines and/or other components may be in fluid communication with one or more MEMS blocks, depending upon system requirements. Multiple blocks may be connected to each other and/or other conventional fluid supply components by conventional high purity lines (e.g., metal and/or plastic) and conventional connectors (e.g., O-rings or gaskets, PVC, flared or compression fittings, welds, etc.)

Preferably, the MEMS components formed in accordance with the present invention have cross-sectional dimensions (e.g., channel width or diameter) no greater than about 200 micrometers (microns), more preferably no greater than about 100 microns, even more preferably no greater than about 50 microns. For example, MEMS components may be designed with cross-sectional dimensions less than about 20 microns, less than about 10 microns, even less than about 5 microns (e.g., in the nanometer range).

The internal system volume within a particular block including one or more MEMS components is preferably no greater than about 20 cubic centimeters (cc), more preferably no greater than about 10 cc, even more preferably no greater than about 5 cc, and most preferably no greater than about 2 cc or even about 1 cc. The depth of flow channels within blocks containing MEMS components preferably is no greater than about 10 millimeters (mm), more preferably no greater than about 5 mm, and most preferably no greater than about 2 mm. The dimensions of MEMS components within these ranges facilitates the delivery of high purity gases at precisely controlled moderate and low flow rates of about 5 standard liters per minute (SLM) or less for gases, and about 200 cubic centimeters per minute (ccm) or less for liquids. Preferably, gases are delivered within the MEMS components in a range of about 0.1 to about 2 SLM, and liquids in a range of about 0.1 ccm to about 200 ccm. However, gas flow rates within MEMS components may be higher than 5 SLM or, alternatively, lower than 0.1 SLM (e.g., 0.5 SLM or less).

Shut-off valves are important components in the MEMS fluid distribution blocks to seal and isolate selected flow lines during various periods of system operation (e.g., purging or evacuating flow lines, directing process fluid through specified flowpaths, etc.). An exemplary shut-off valve utilized in the MEMS devices of the present invention is depicted in FIG. 1. The valve is similar in design and operation to the cantilever-type shut-off valves that are well known in the art as described above. The shut-off valve is manufactured utilizing any of the above-identified MEMS techniques, with portions of the valve being composed of any suitable materials as noted above.

Shut-off valve 1 includes a die section 2 formed on a substrate or block 4 with micro-channels formed within the block to provide flowpaths for the valve as described below. A cavity is defined between the die section 2 and the block 4, and a cantilevered valve member 6 is disposed within the cavity and pivotally secured at one end to the die section 2. A fluid flow path is defined within the valve by a generally vertically extending first channel 8 communicating with a flow passage including a general horizontal section extending below valve member 6 and a general vertical section extending at an upstream location to a valve sealing point defined by the interaction of valve member 6 and a sealing die section 12. A second channel 14 is disposed downstream of the valve sealing point and includes a generally horizontal section extending from the valve sealing point and a generally vertical section extending into the block 4. The first and second channels 8 and 14 are in fluid communication with other micro-channels disposed in the block 4 that provide a fluid flow path to other components defined on the block 4 and/or disposed at locations removed from the block 4. As depicted by the arrows in FIG. 1, the first channel 8 serves as the inlet channel and the second channel 14 serves as the outlet channel for the valve 1.

In a normally closed position, the valve member 6 engages sealing die section 12 to substantially prevent fluid from flowing from the inlet channel 8 to the outlet channel 14. A membrane 16 is disposed at a location between die section 2 and valve member 6 and includes a sealed fluid that, when heated, effects movement of the membrane 16 to in turn effect pivotal movement of valve member 6 from the normally closed position to a position removed from sealing die section 12. An actuator 18, including resistor elements, receives electrical energy inputs to heat the fluid within the membrane so as to cause movement of the membrane and resultant pivotal movement of the valve member 6. Thus, when valve 1 is in the open position, fluid moves through the valve from the first or inlet channel 8 to the second or outlet channel 14 as generally indicated by the arrows in FIG. 1.

As noted above, the cantilever-type MEMS shut-off valve of FIG. 1 is basically a "directional" valve having asymmetrical sealing characteristics. This type of valve performs well in the normally closed position when the valve is implemented in a forward orientation with respect to fluid flowing through the valve in a positive flow direction as indicated by the arrows in FIG. 1 (i.e., from the first or inlet channel 8 to the second or outlet channel 14). However, the fluid leakage rate (i.e., the flow rate at which fluid leaks around the sealing member when the sealing member is in the closed position) for the same pressure differential is greater in the negative flow direction (i.e., in the direction from the second channel to the first channel) in comparison to the positive flow direction, due to the fluid acting on the valve member 6 in a direction opposing the sealing engagement with the sealing die section 12. As the pressure differential increases to about 5–10 psi (about 34.5–70 kPa) or greater, the fluid leakage rate becomes very high in the negative flow direction and exceeds the semiconductor processing industry standard for acceptable leakage of fluids (e.g., about $1 \times 10^{-9}$ Atm*scc/sec when utilizing helium).

The directionality and asymmetrical leakage characteristics of this cantilever-type valve are a concern in complex, multi-state chemical processing and distribution systems. Many complex systems require venting, purging and/or evacuation of fluids in addition to the primary mode of delivering fluid to a particular destination or delivery site. In alternating between the primary delivery mode and other modes, the pressure gradient across a shut-off valve can reverse during system operation. In situations where highly reactive and toxic chemical compounds are utilized (e.g., during semiconductor fabrication), this can create serious problems. Thus, the use of conventional cantilever-type MEMS shut-off valves in complex high purity distribution systems can present reliability issues during system operation.

The asymmetrical leakage problem is resolved, in accordance with the present invention, by implementing a distribution flow system with at least one shut-off valve positioned in a reverse orientation with respect to the normal flow of fluid through the system. Preferably, at least two cantilever-type valves are oriented in opposite directions with respect to each other. In particular, one of the "directional" cantilever-type valves is implemented in a forward orientation with respect to the normal flow path of fluid through the valve (i.e., in the manner as described above and depicted in FIG. 1, where the normal flow of fluid is from the first or inlet channel 8 to the second or outlet channel 14), while the other valve is implemented in a reverse orientation with respect to the normal flow path of fluid through the valve (i.e., the normal flow of fluid through the valve is from the second channel 14 to the first channel 8). An exemplary embodiment of this orientation is depicted in the system block schematically depicted in FIGS. 2a and 2b. It is noted that, in all of the figures described herein in which portions of a distribution system are schematically depicted, the forward or reverse orientation of the "directional" cantilever-type valve is represented by an arrow indicating the direction from the first channel to the second channel of the valve (where the first and second channels are as described in FIG. 1), and a divided quarter section of the valve is either shaded to indicate the valve is in a closed position or un-shaded to indicate the valve is in an open position.

System block 40 includes shut-off valves 44 and 46 that are similar to the design of the valve depicted in FIG. 1, with arrows 42 depicting the normal flow of fluid through the system during a chemical delivery mode. The first valve 44 is oriented in a forward orientation with respect to normal fluid flow during chemical delivery mode (i.e., the first channel of valve 44 serves as the inlet and the second channel serves as the outlet). In contrast, the second valve 46 is oriented in a reverse orientation with respect to normal fluid flow and an opposing direction with respect to the first valve 44 (i.e., the second channel of valve 46 serves as the inlet and the first channel serves as the outlet). The valves are both open in FIG. 2a to permit fluid to flow through the system, and both valves are closed in FIG. 2b to prevent fluid from flowing between the valves. This combined valve orientation provides an effective and symmetric seal on either opposing side of the two valves when both valves are closed, thus significantly reducing the potential for high leakage that would otherwise exist for a single "directional" valve. Further, the addition of a second MEMS valve in this manner in a flow distribution system would have little or no effect in increasing the system size, as the two valves could be integrated into a single MEMS block.

Thus, the combined valve orientation described above facilitates the use of the cantilever-type shut-off valve in a complex chemical distribution system, particularly in systems where high pressure differential seals are required and/or varying pressure differentials are capable of developing in different branches or sections during system operation. In particular, complex systems may be designed that facilitate pressurization of fluids for delivery, providing vacuum, cleaning and/or purging of distribution lines, and further combined with precise mass flow control, etc.

Figure 2A:
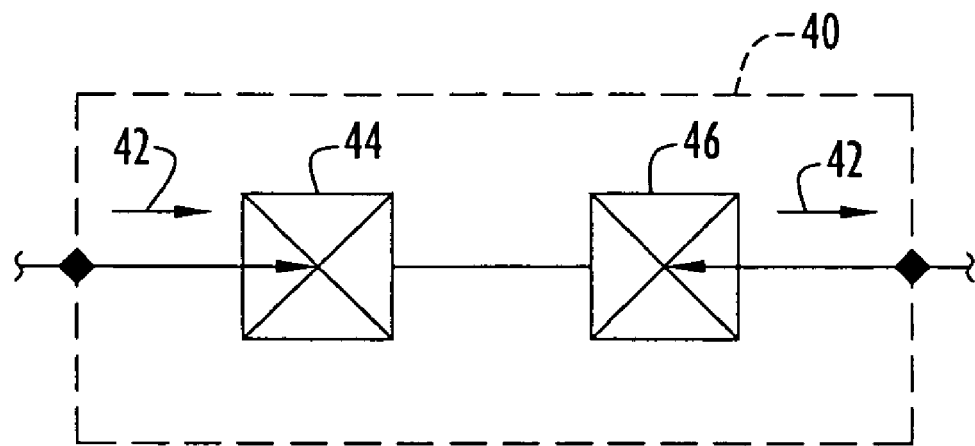
FIGS. 2a and 2b depict a schematic view of a fluid distribution system including two "directional" MEMS shut-off valves oriented in opposing directions with respect to each other in accordance with the present invention to establish a combined valve with symmetric sealing characteristics.
Figure 2B:
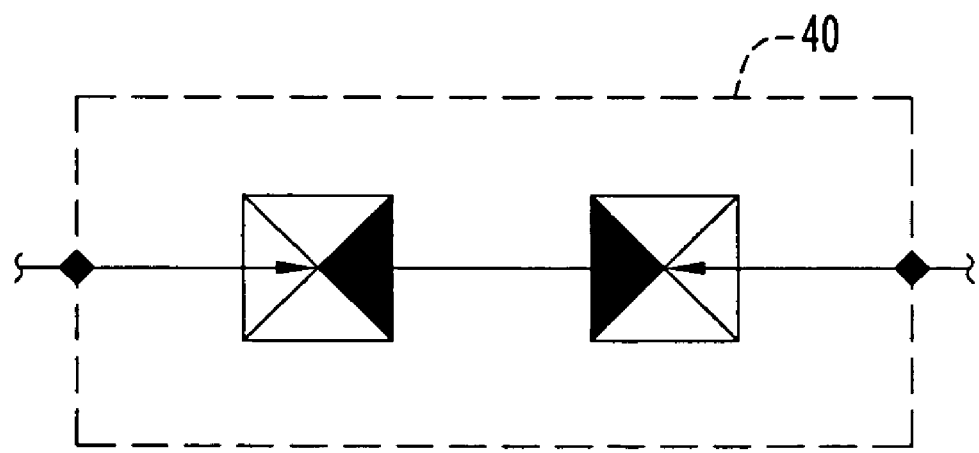

Pairs of opposing valves, as set forth in FIGS. 2a and 2b, may be positioned at all MEMS shut-off valve locations in the system. Alternatively, one or more valves may be oriented in a reverse orientation with respect to the normal flow of fluid (i.e., with the second channel of the valve serving as the inlet channel and the first channel serving as the outlet channel) at one or more selected locations where reversing pressure differentials are anticipated during system operation. It is further noted that the configuration of FIGS. 2a and 2b may be further modified to combine the "symmetrical" dual or combination valve design so as to utilize a single membrane to effect the simultaneous opening and closing of both valves.

Figure 3A:
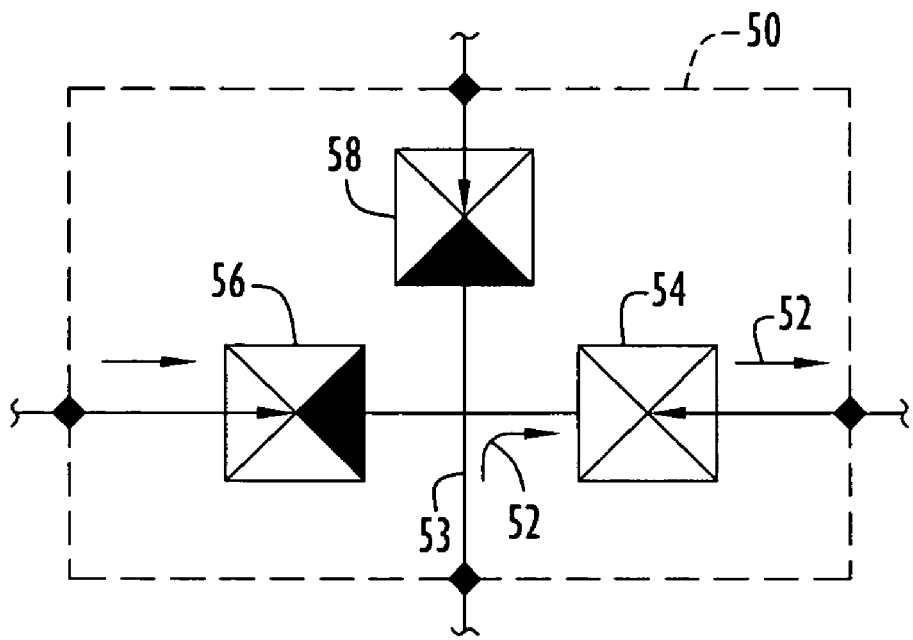
FIGS. 3a and 3b depict a schematic view of a fluid distribution block in accordance with the present invention and including vacuum/purge/cleaning modes of operation, with a "directional" MEMS shut-off valve disposed in a reverse orientation with respect to the flow of fluid in the delivery mode.
Figure 3B:
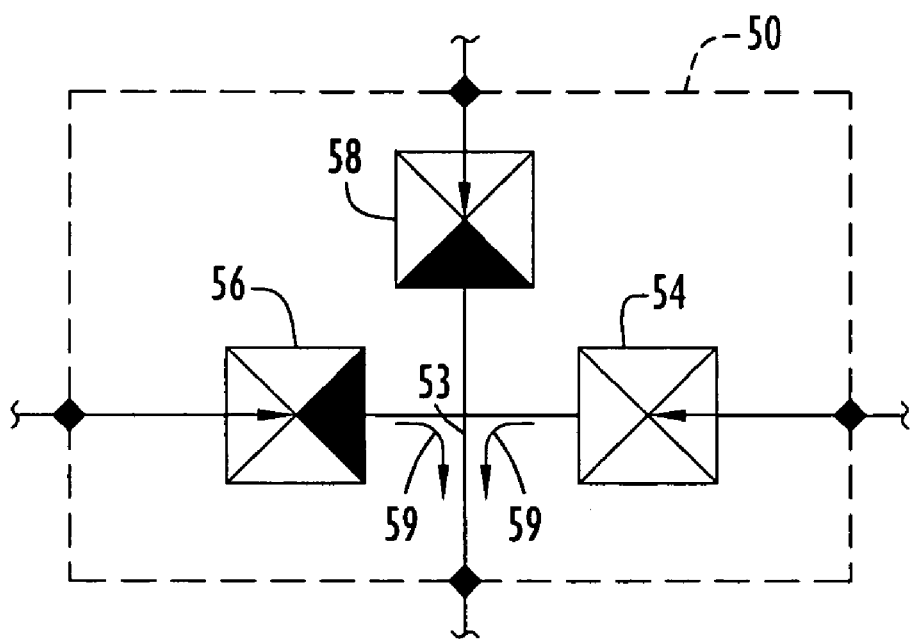

In an exemplary embodiment depicted in FIGS. 3a and 3b, a MEMS shut-off valve is implemented in a reverse orientation with respect to the normal flow direction of fluid through the system block during a chemical delivery mode to facilitate cleaning of the distribution lines upstream of the valve while preventing significant leakage of downstream fluid through the valve. Referring to FIG. 3a, a system block 50 includes a first shut-off valve 54 that is open and through which fluid flows from a branched delivery line 53 (as indicated by arrows 52) for delivery to a particular location, such as a semiconductor processing tool (e.g., a manifold for delivering one or more chemicals to a semiconductor fabrication process and/or any conventional or other manufacturing tool utilized in a semiconductor fabrication process). Valve 54 is implemented in a reverse orientation with respect to the normal flow of fluid from delivery line 53 through the valve (as indicated by the arrow depicted in FIG. 3a for valve 54).

A second shut-off valve 56 is disposed upstream of the first shut-off valve 54 and is in a closed position during the chemical delivery mode. The second shut-off valve 56 serves as a purge valve to permit a cleaning gas or liquid to flow into and clean the distribution lines when the chemical delivery is halted in block 50. A third shut-off valve 58 is situated on a second branch line disposed between the first and second shut-off valves. The third shut-off valve 58 also serves as a purge valve to permit a cleaning gas or liquid to flow into and clean the distribution lines when chemical delivery in the block is halted. Both the second and third shut-off valves are implemented in a forward orientation with respect to purging fluid flowing through each valve into the system block (as indicated by the arrows depicted in FIG. 3a for valves 56 and 58). Since the purging fluid is maintained at a higher pressure than the pressure applied during the chemical delivery mode, the second and third shut-off valves maintain a tight seal when in their closed positions to prevent mixing of purging fluid with the fluid delivered from the system block through the first shut-off valve 54 and to the delivery location.

During periods when the chemical delivery mode is halted (e.g., when the chemical supply source needs to be refilled and/or changed), the first shut-off valve 54 is closed, as depicted in FIG. 3b, and the distribution lines can be purged and/or cleaned by applying a vacuum at line 53. The applied vacuum draws any residual fluid in the lines through line 53 (as indicated by arrows 59) and to a desired evacuation destination (e.g., a collection tank). Optionally, one or both of the second and third shut-off valves 56,58 may be opened to deliver a purging/cleaning fluid into the distribution lines for further cleaning of the lines prior to switching back to the chemical delivery mode.

During the vacuum/purging/cleaning mode, the pressure upstream from the first shut-off valve 54 drops, while the pressure downstream from the valve 54 is substantially maintained the same as when fluid is flowing in the chemical delivery mode. However, the reverse orientation of the valve 54 effectively prevents backflow of chemical fluid from valve 54 into the distribution lines being purged and/or cleaned.

In the embodiments schematically depicted in FIGS. 4A–4G, a system block facilitates delivery of a chemical fluid to a particular delivery site (e.g., a semiconductor processing tool) and further incorporates separate pressurization and vacuum/purge/cleaning lines into a single MEMS block. Alternatively, it is noted that these components may also be integrated into any selected number of separate blocks that are in fluid communication with each other.

Figure 4A:
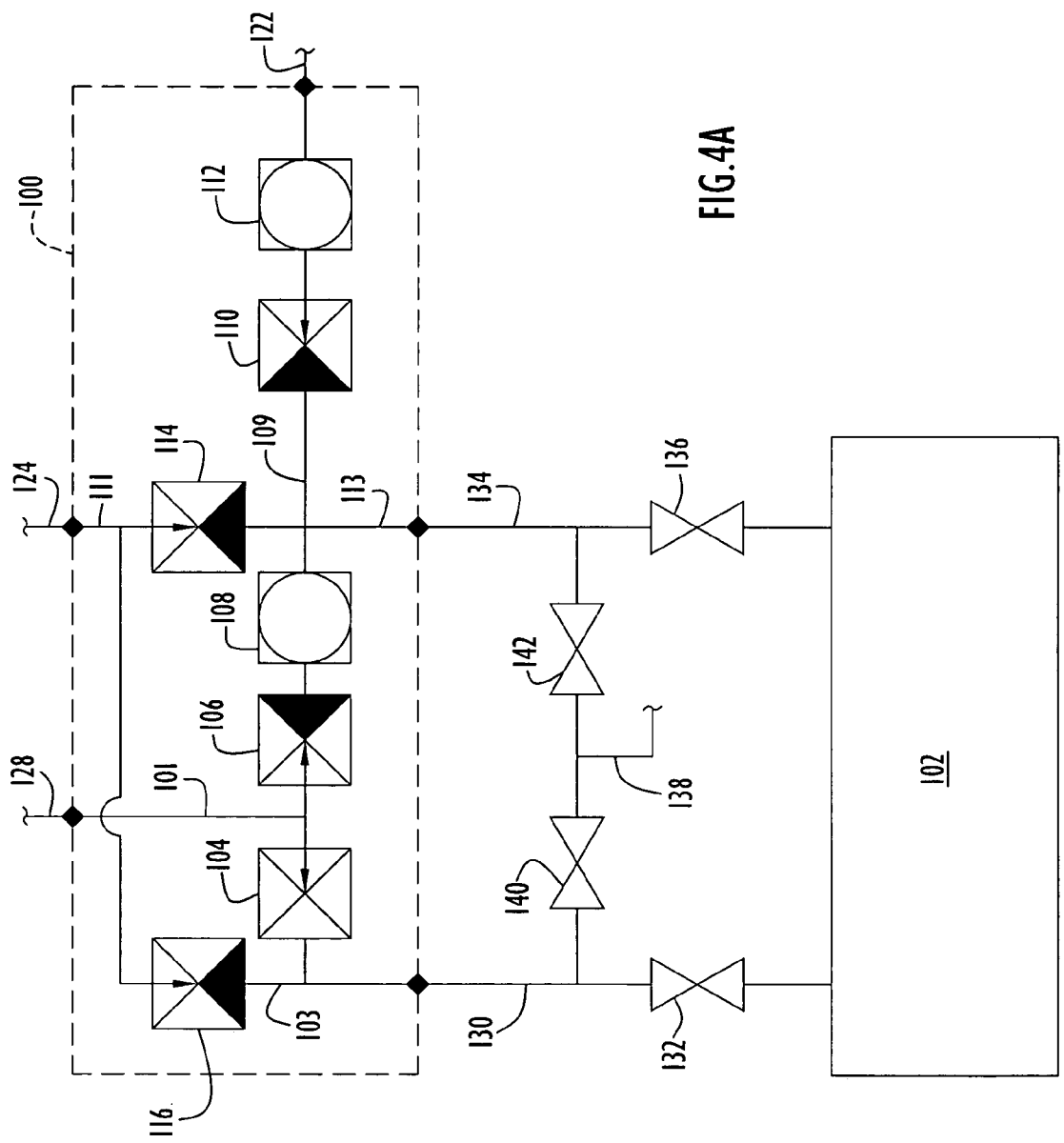
FIGS. 4A–4G depict schematic views of a fluid distribution system in accordance with the present invention and including a fluid distribution block with a plurality of MEMS shut-off valves and MEMS pressure sensors in fluid communication with a chemical storage tank and a fluid delivery line.

Referring to FIG. 4A, a fluid distribution system includes a processing block 100 that pressurizes and receives chemical fluid from a storage tank 102 for delivery at a selected pressure from the block. Specifically, block 100 includes at least five "directional" cantilever-type MEMS shut-off valves that are all similar in design to the valve depicted in FIG. 1. Block 100 further includes a pair of MEMS pressure sensors disposed at certain locations to measure the chemical to be delivered to the site from tank 102. Any one or more conventional or other suitable processors may be utilized to facilitate communication with and control of the MEMS valves and sensors during system operation.

A pressurization channel 101 is disposed in block 100 and extends to a pressurization inlet port that is in fluid communication with a non-MEMS pressurization line 128 (e.g., metal steel or plastic tubing) extending from the block 100 to a pressurization supply source (not shown). The pressurization source may be a supply tank containing a suitable pressurization fluid (e.g., helium). The pressurization channel 101 extends within block 100, forming a T-branch that extends at each side of the T-branch to first and second shut-off valves 104 and 106. The first and second shut-off valves 104, 106 are implemented on block 100 in a forward orientation with respect to the normal flow of pressurization fluid flowing through these valves but in opposing orientations with respect to each other (as indicated by the arrows depicted in FIG. 4A for valves 104 and 106). A channel 103 extends in the block 100 from the first shut-off valve 104 to a pressurization outlet port that is in fluid communication with a non-MEMS pressurization line 130 extending from the block to storage tank 102. Optionally, a conventional, high purity non-MEMS shut-off valve 132 (e.g., a butterfly valve) may be implemented along line 130 near tank 100 to facilitate sealing and isolation of the tank from the system block during periods of purging/cleaning of the system block as described below.

Disposed downstream from second shut-off valve 106 and implemented in series along a main flow channel 109 disposed within block 100 are the following MEMS components (in sequential order): a first pressure sensor 108, a third shut-off valve 110 and a second pressure sensor 112. The third shut-off valve 110 is implemented in the block 100 in a reverse orientation with respect to the normal flow of fluid through the block during the chemical delivery mode (as indicated by the arrow on valve 110 in FIG. 4A). Channel 109 further extends downstream from the second pressure sensor 112 to an outlet port for block 100. The outlet port is in fluid communication with a non-MEMS fluid delivery line 122 that delivers fluid from the block 100 to the delivery site (e.g., a semiconductor processing tool).

A chemical supply channel 113 disposed within the system block 100 branches from the main channel 109 at a location between the first pressure sensor 108 and the third shut-off valve 110. The chemical supply channel 113 extends to a chemical supply port that is in fluid communication with a non-MEMS chemical supply line 134 extending from the block 100 to supply tank 102. Optionally, a conventional, high purity non-MEMS shut-off valve 136 may be implemented along line 134 near tank 100 to facilitate sealing and isolation of the tank from the system block during periods of purging/cleaning of the system block as described below. In addition, lines 130 and 134 are preferably connected to each other via an exhaust line 138 to permit exhausting of residual fluid from the system block through exhaust line to a collection site (not shown) during a vacuum/purge/cleaning mode. Conventional, non-MEMS valves 140, 142 may be provided on exhaust line 138 to seal the exhaust line from the tank 100 and the system block 100 during periods of non-use.

A gas purge/liquid flush supply line is provided independent from the pressurization supply line in block 100 to facilitate separate and different flows of pressurization and purging/cleaning fluids during various modes of system operation. In particular, a fourth shut-off valve 114 is implemented along a channel 111 disposed within the block and branching from the main channel 109 between the first pressure sensor 108 and the third shut-off valve 110. A portion of channel 111 extends from the fourth shut-off valve 114 to an inlet port in fluid communication with a non-MEMS purge/flush line 124 extending from the block 100 to a supply source (not shown). The supply source may be a tank for delivering a purging gas (e.g., nitrogen) or flushing liquid (e.g., an aqueous or organic fluid such as octane, isopropanol, toluene, etc.) into the system block during a vacuum/purge/cleaning mode as described below. Valve 114 is implemented on channel 111 in a forward orientation with respect to the normal flow of purge/flush fluid to be directed through channel 111 (as indicated by the arrow depicted in FIG. 4A for valve 114).

Channel 111 further includes a branched section at a location upstream of the fourth shut-off valve 114. A fifth shut-off valve 116 is implemented on the branched section of channel 111 and is oriented in a forward orientation with respect to the normal flow of purging/flushing fluid to be delivered through the valve (as indicated by the arrow for valve 116 in FIG. 4A). The branched section extends from the outlet of valve 114 to channel 103.

Figure 4B:
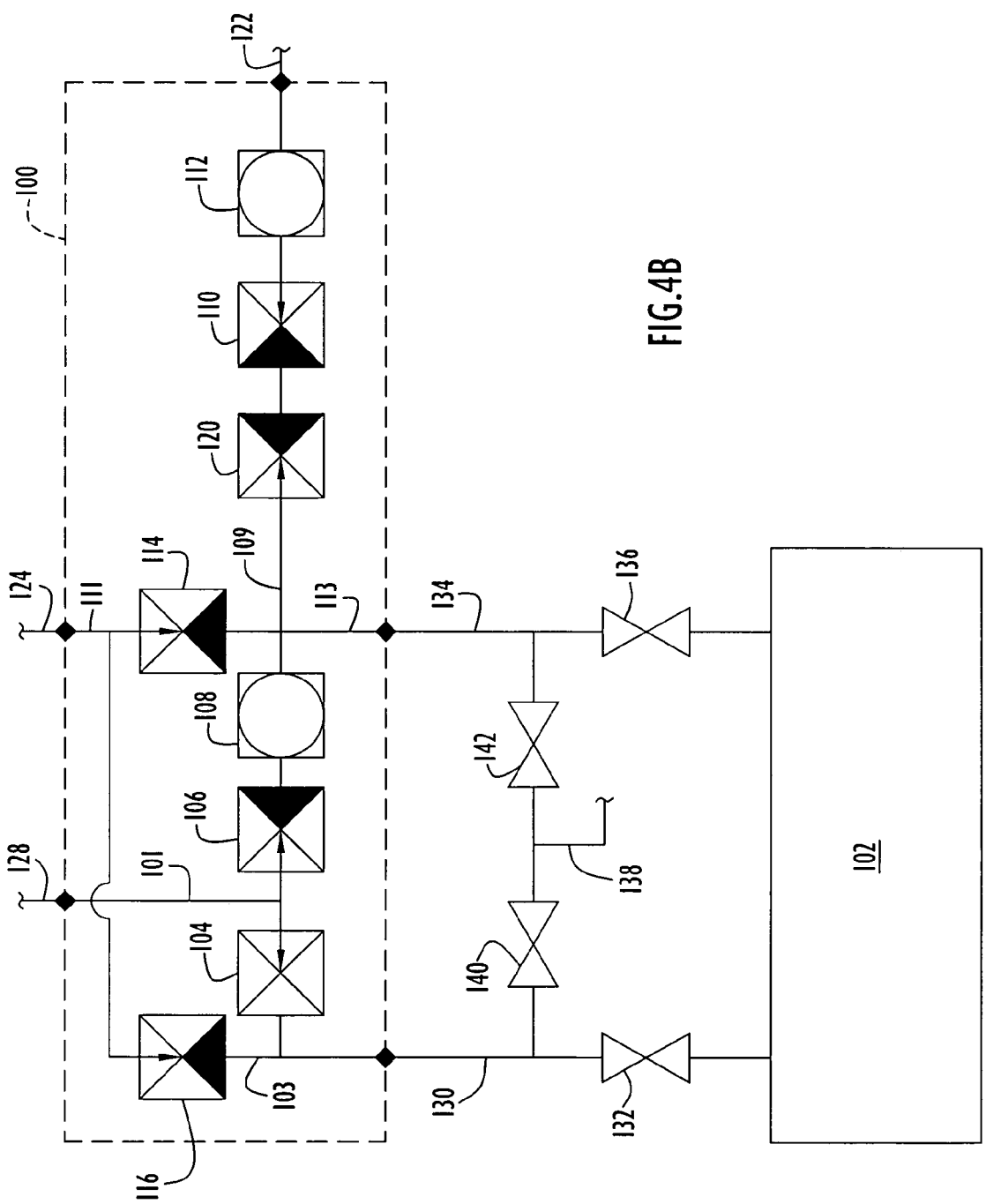
Figure 4C:
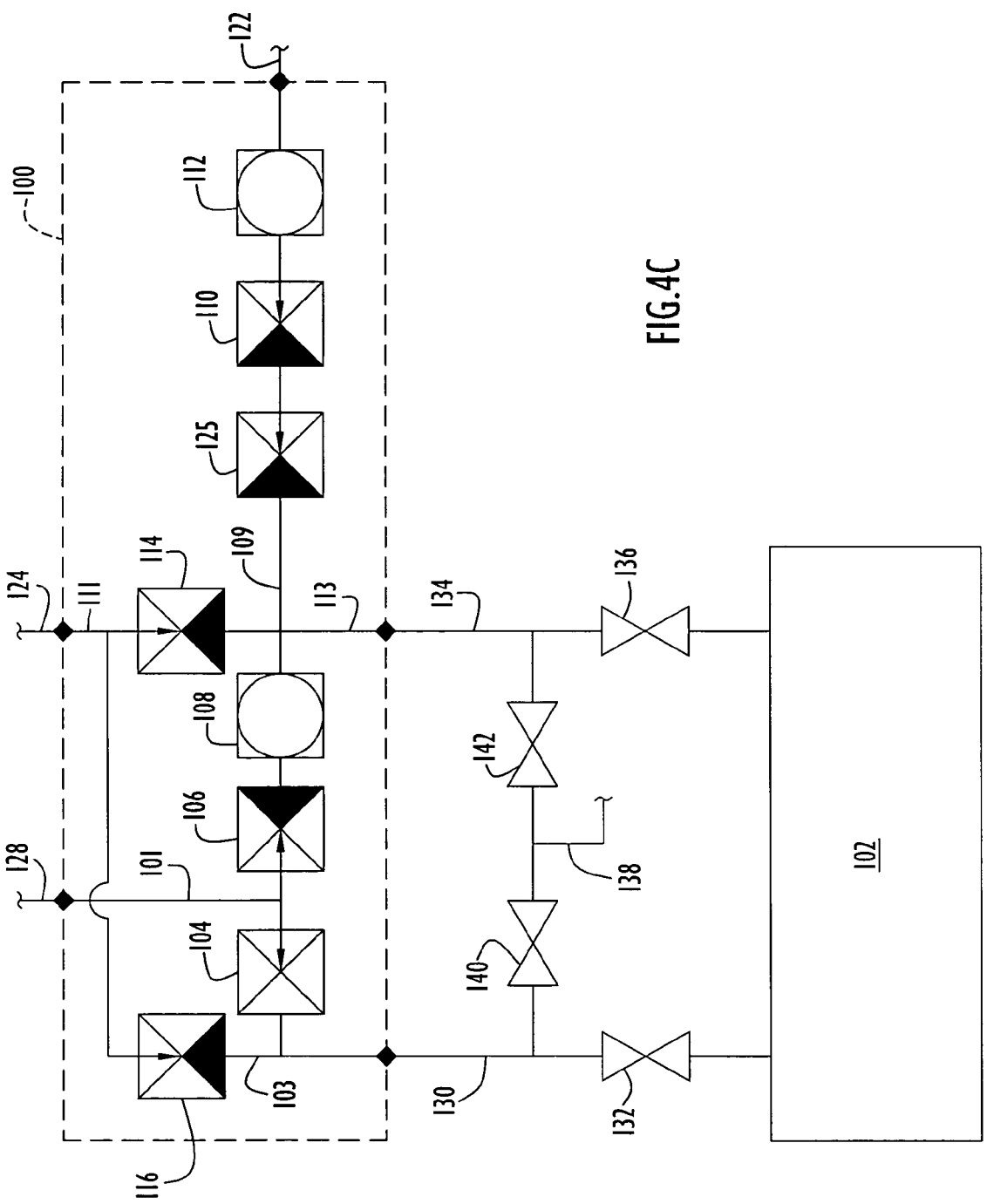

Optionally, a combined shut-off valve design similar to the embodiment described above and depicted in FIGS. 2a and 2b may be implemented in the system block 100 as follows. Referring to FIG. 4B, a sixth shut-off valve 120 is further implemented within the system block 100 and is disposed along the main channel 109 at a location between the first pressure sensor 108 and valve 110. The sixth shut-off valve 120 is implemented on channel 109 in a forward orientation with respect to the normal direction of fluid flow through the main channel 109 (as indicated by the arrow depicted in FIG. 4B for valve 120). This combination of shut-off valves provides valve leakage symmetry at the location of valves 110 and 120 so as to substantially prevent leakage of fluid in either direction due to variations in pressure differentials during changes in modes of system operation.

The system block 100 of FIG. 4A may also be modified to provide one or more additional redundant MEMS shut-off valves with virtually no increase in system size (as the additional MEMS shut-off valves may be implemented in the same system block), volume, or susceptibility to system contamination. Redundant components are required in certain systems in which isolation between two or more sections within the system is absolutely essential to ensure complete avoidance of cross-contamination within the system and/or operational safety. In the exemplary embodiment of FIG. 4C, an additional, redundant shut-off valve 125 is implemented in-line along channel 109 and between pressure sensor 108 and shut-off valve 110. Valve 125 is implemented on channel 109 in a reverse orientation with respect to the normal flow of fluid through the valve (as indicated by the arrow depicted in FIG. 4C on valve 125). Thus, valve 125 is oriented in the same manner as valve 110 on channel 109. The redundant valve 125 serves a dual purpose in system block 100. The primary purpose of valve 125 is to ensure that pressurized fluid in chemical delivery line 122 does not leak back into system block 100 in the event a failure occurs in valve 110 during non-delivery operational modes. Secondly, the valve 125 further lowers potential for leakage of fluid from the delivery line 122 into the system block 100 by several orders of magnitude due to micro-leaks that may develop at the sealing portions of the MEMS shut-off valves.

The various modes of system operation will now be described with reference to FIGS. 4B and 4D–4G. In FIG. 4B, the system is depicted in a stand-by mode when no fluid is flowing from the system block 100 to the delivery site. In this mode, valve 104 is open to facilitate pressurization of chemical fluid in tank 102, while valves 106, 110 and 120 remain closed, thus preventing flow of fluid from tank 102 and the block 100 into delivery line 122. Valves 114 and 116 are also closed to prevent the flow of purging/flushing fluid beyond these valves and through the system block 100. Valves 132 and 136 are open, while valves 140 and 142 are closed. In situations where the fluid pressure at a location downstream of the system block 100 is greater than the pressure of fluid within the block (i.e., the pressure measured at the second pressure sensor 112 is greater than the pressure measured at the first pressure sensor 108), backflow of fluid from delivery line 122 is substantially minimized or prevented from flowing into the main portions of the system block due to the reverse orientation of valve 110. Similarly, when fluid within the system block 100 is pressurized to a pressure that is greater than the fluid pressure downstream from the block (i.e., the pressure measured at the first pressure sensor 108 is greater than the pressure measured at the second pressure sensor 112), valve 120 substantially prevents flow of fluid from the block 100 into delivery line 122. The purge/flush line 124 is maintained at the same or higher pressure than the pressure within the block 100 (as measured by sensor 108) to prevent leakage of fluid from the block at valves 114 and 116 into line 124.

Figure 4D:
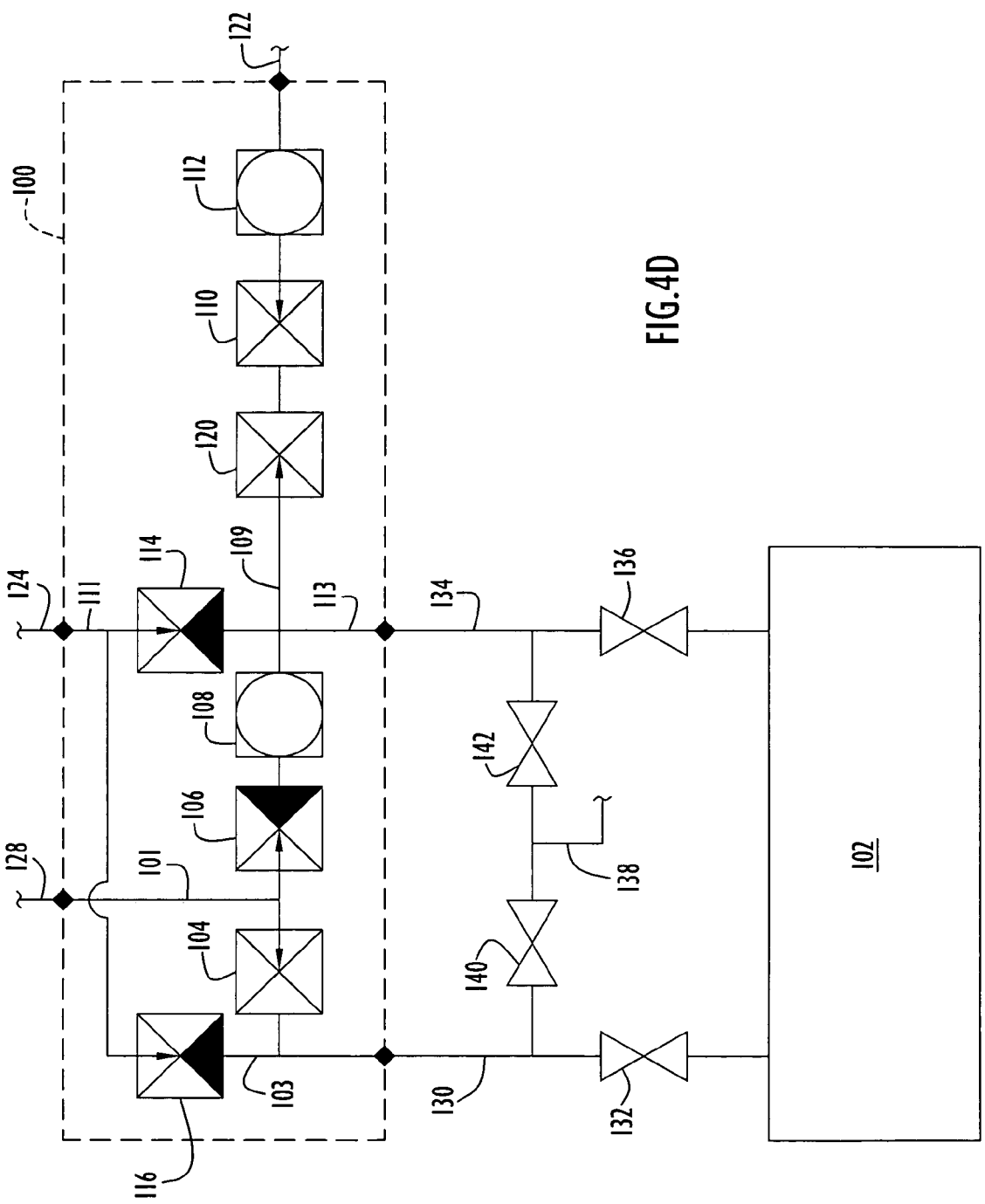

During the chemical delivery mode, as depicted in FIG. 4D, valves 104, 110 and 120 in the system block 100 are open to permit pressurization of chemical fluid within tank 102 and the flow of fluid from the tank through line 134 and into and through block 100 to delivery line 122, while valves 106, 114 and 116 remain closed. Valves 132 and 136 are also open, while valves 140 and 142 are closed. Pressure sensor 108 monitors the fluid pressure within the tank 102, while pressure sensor 112 monitors fluid pressure within the delivery line 122. Process controllers may be used to ensure the pressure in the system block is maintained at a higher pressure than the pressure downstream of the system block (e.g., by controlling the flow of pressurized fluid to the storage tank) in order to facilitate the flow of fluid at a desired rate during the chemical delivery mode. The purge/flush line 124 is maintained at the same or higher pressure than the pressure within the block 100 (as measured by sensor 108) to prevent leakage of fluid from the block at valves 114 and 116 into line 124.

Figure 4E:
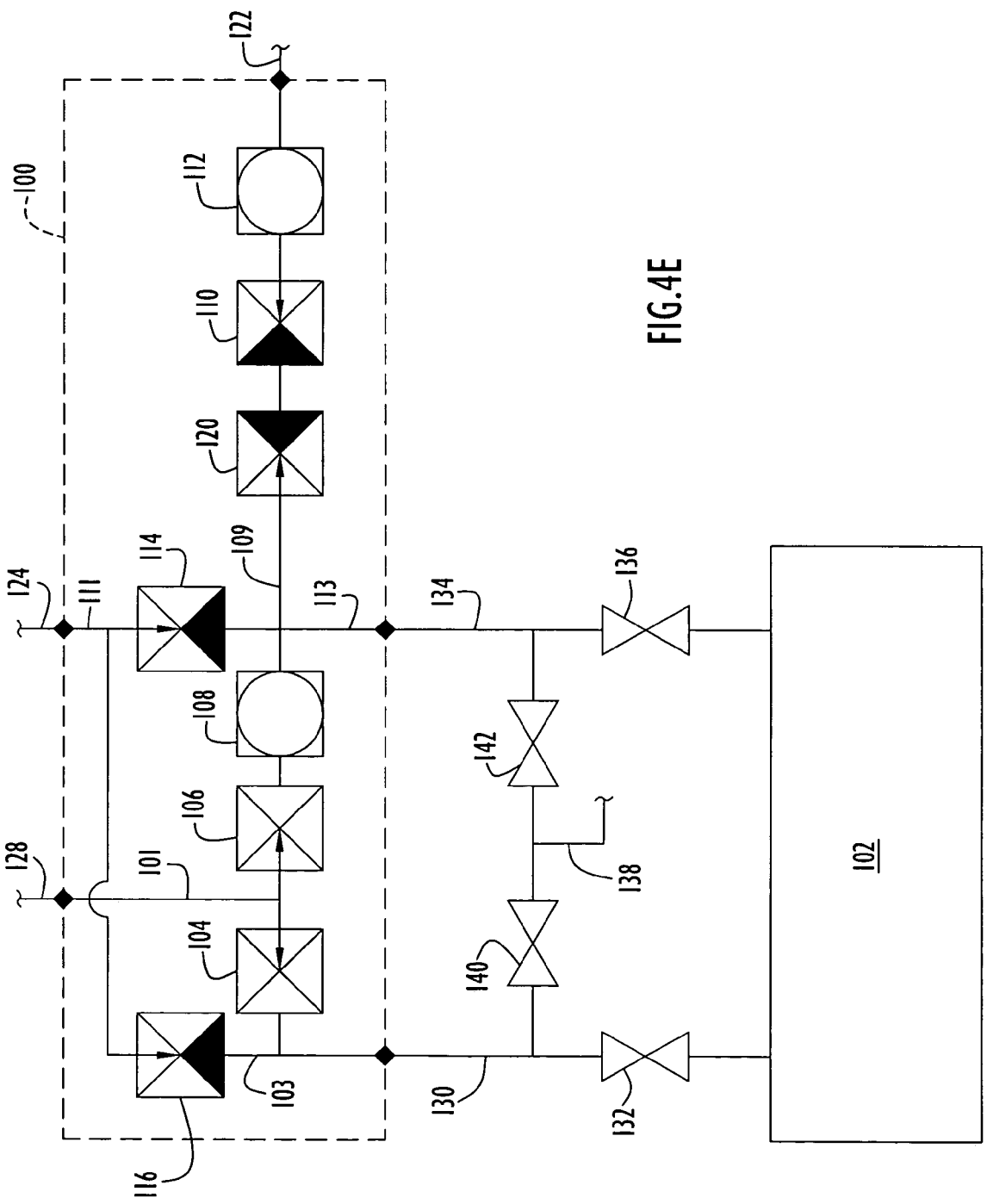

When it is desired to halt chemical delivery to the delivery site and drain and purge the system block 100 with pressurization fluid, valves are opened and closed as described below and depicted in FIG. 4E. Specifically, valves 104 and 106 are opened and valves 110, 114, 116 and 120 are closed to facilitate the flow of the pressurization fluid (e.g., helium) into the system block 100 and to force residual fluid through the system block and into lines 130 and 134. Valves 132 and 136 are closed to isolate the storage tank, and valves 140 and 142 are opened to facilitate flow of the fluids evacuated from the system block 100 into exhaust line 138, where the fluids are then collected at a collection site (e.g., a collection tank). If the chemical delivery line 122 is to also be purged, valves 110 and 120 may also be opened to permit the pressurization fluid to flow from the system block into the delivery line 122. The pressure of fluids within the system block and the chemical delivery line are monitored by the pressure sensors 108, 112, and the purge/flush line 124 is maintained at the same or higher pressure than the pressure within the block 100 (as measured by sensor 108) to prevent leakage of fluid from the block at valves 114 and 116 into line 124.

Figure 4F:
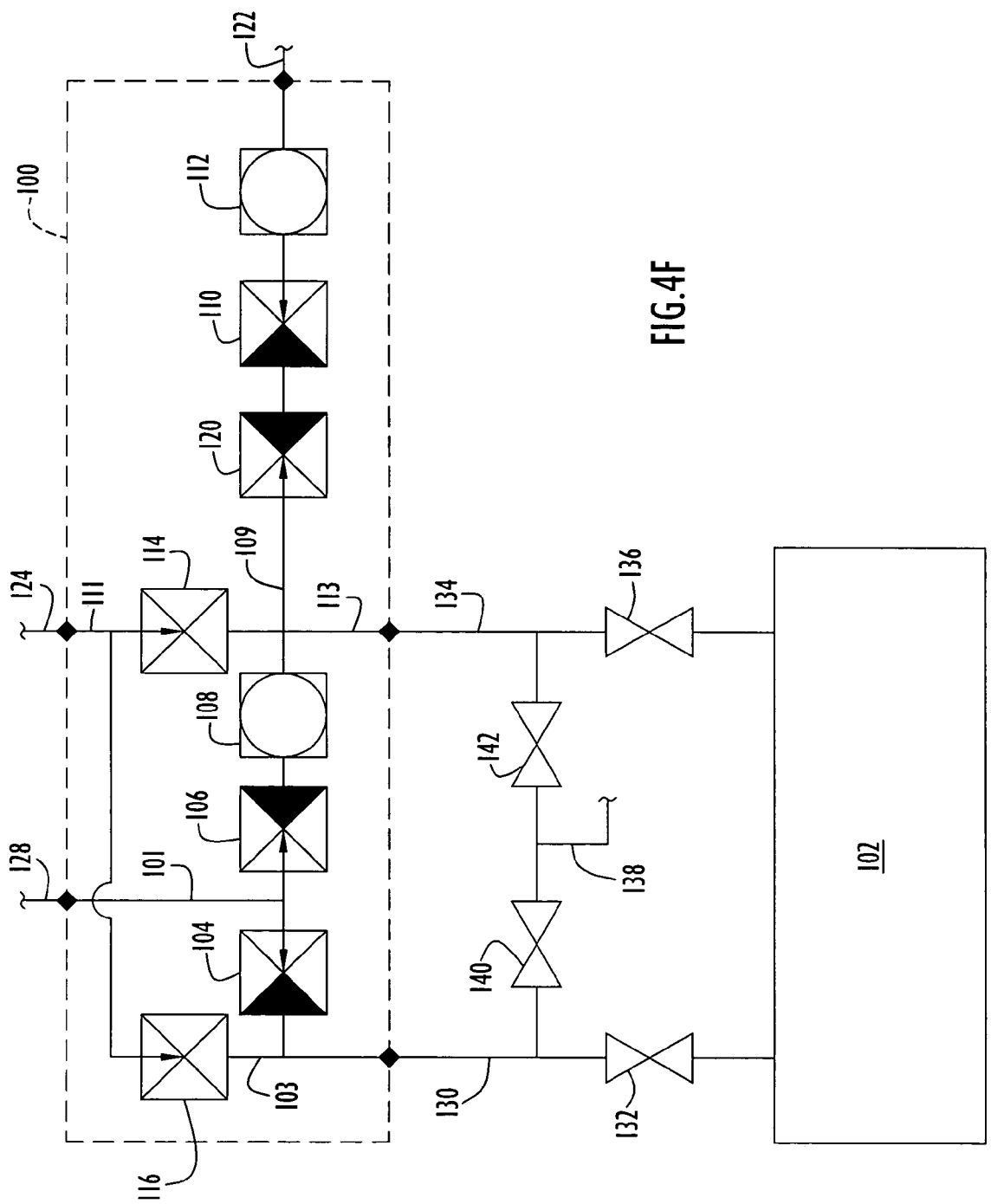

The system block channels and/or other fluid lines of the system may also be cleaned with a gas (e.g., nitrogen) or liquid (e.g., an aqueous or organic fluid such as octane, isopropanol, toluene, etc.) in a purge/flush mode utilizing purge/flush line 124. Referring to FIG. 4F, valves 104 and 106 are closed to prevent pressurization fluid from entering the system block 100. Valves 110 and 120 are closed to prevent cleaning fluid from entering line 122. Alternatively, if cleaning of the chemical delivery line 122 is required, valves 110 and 120 may be opened to permit cleaning fluid to flow into delivery line 122. One or both of valves 114 and 116 are open (both are shown as open in FIG. 4F), depending upon the desired flow path of cleaning fluid through the system block. Valves 132 and 136 are closed to prevent cleaning fluid from entering storage tank 102. In addition, valves 140 and 142 are open to facilitate flow of cleaning fluid and residual chemical fluid removed from block 100 into evacuation line 138 to a collection site. The pressure sensors 108 and 112 monitor fluid pressure within the system block 100 and the chemical delivery line 122, and the pressure of pressurization fluid in line 128 is maintained at the same or higher pressure than the pressure within the system block (as monitored by pressure sensor 108) to maintain a tight seal at valves 104 and 106. The combination of closed valves 110 and 120 substantially prevents mixing of cleaning fluid in the system block with fluid in the delivery line.

Figure 4G:
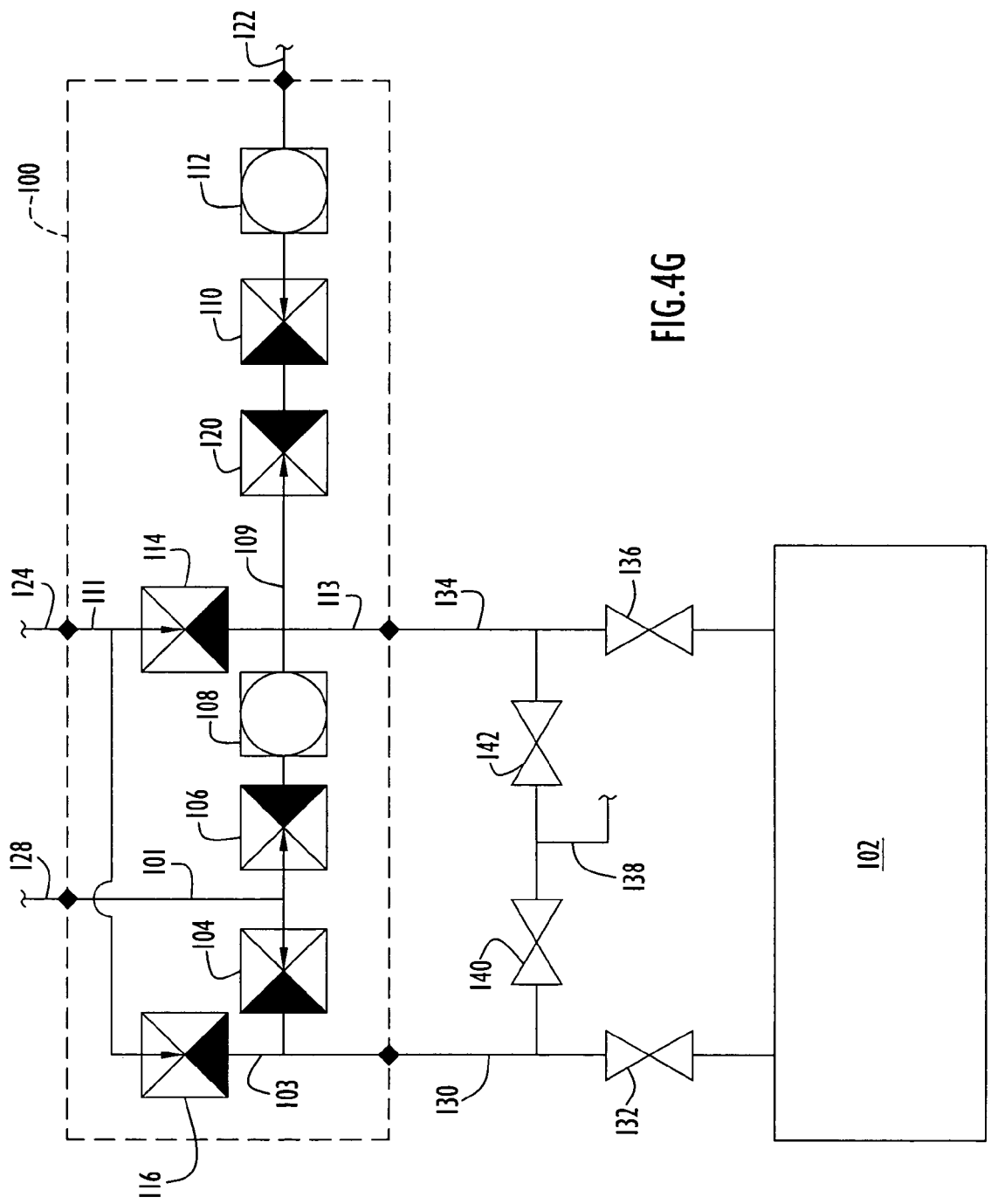

In an evacuation mode, as depicted in FIG. 4G, valves 104, 106, 114 and 116 are closed to prevent flow of pressurization fluid and cleaning fluid into the major portions of the system block 100. Valves 110 and 120 are also closed to prevent backflow of fluid in delivery line 122 from being directed back into the system block 100. Alternatively, if evacuation of fluid within the delivery line 122 is required, valves 110 and 120 may be opened to permit such evacuation. Valves 132 and 136 are closed to isolate the tank 102 from the rest of the system and valves 140 and 142 are open. A vacuum is applied (e.g., via a vacuum pump) to evacuation line 138 to evacuate residual fluid within the system block 100 and/or fluid from the delivery line 122.

Thus, the system of FIGS. 4A–4G provides a complex MEMS block integrated with other conventional fluid processing components in a high purity chemical distribution system that is highly reliable and minimizes or substantially prevents leakage at the MEMS valves disposed in the system block. In particular, the system facilitates the use of a different purging/cleaning fluid to be used independent of the pressurization fluid. This feature becomes very important when the pressurization fluid is expensive and it is desirable to limit its use primarily for pressurization purposes to minimize operational costs. Further, the system may be easily modified to include any number of additional redundant MEMS shut-off valves and/or combinations of MEMS shut-off valves to achieve a symmetrical leakage characteristic as described above. For example, the implementation of dual opposing shut-off valves (as described above and depicted in FIGS. 2a and 2b) at the locations of shut-off valves 104, 106, 114 and 116 would minimize or eliminate the requirement that the pressurization fluid and/or purge/cleaning fluid need to be at certain minimum pressures to avoid leakage at these valves. The implementation of such additional MEMS shut-off valves becomes relatively easy and cost-effective, without significantly increasing system size and internal volume requirements. In contrast, modifications to traditional, non-MEMS fluid distribution systems to add additional redundant or other valves so as to ensure delivery of chemicals at high purity will significantly increase the system size and expense (due to the increased number of high purity connectors and components needed) as well as increase the probability for system contamination (due to the increased internal volume and difficulty in cleaning, purging and evacuating branched lines).

Figure 5A:
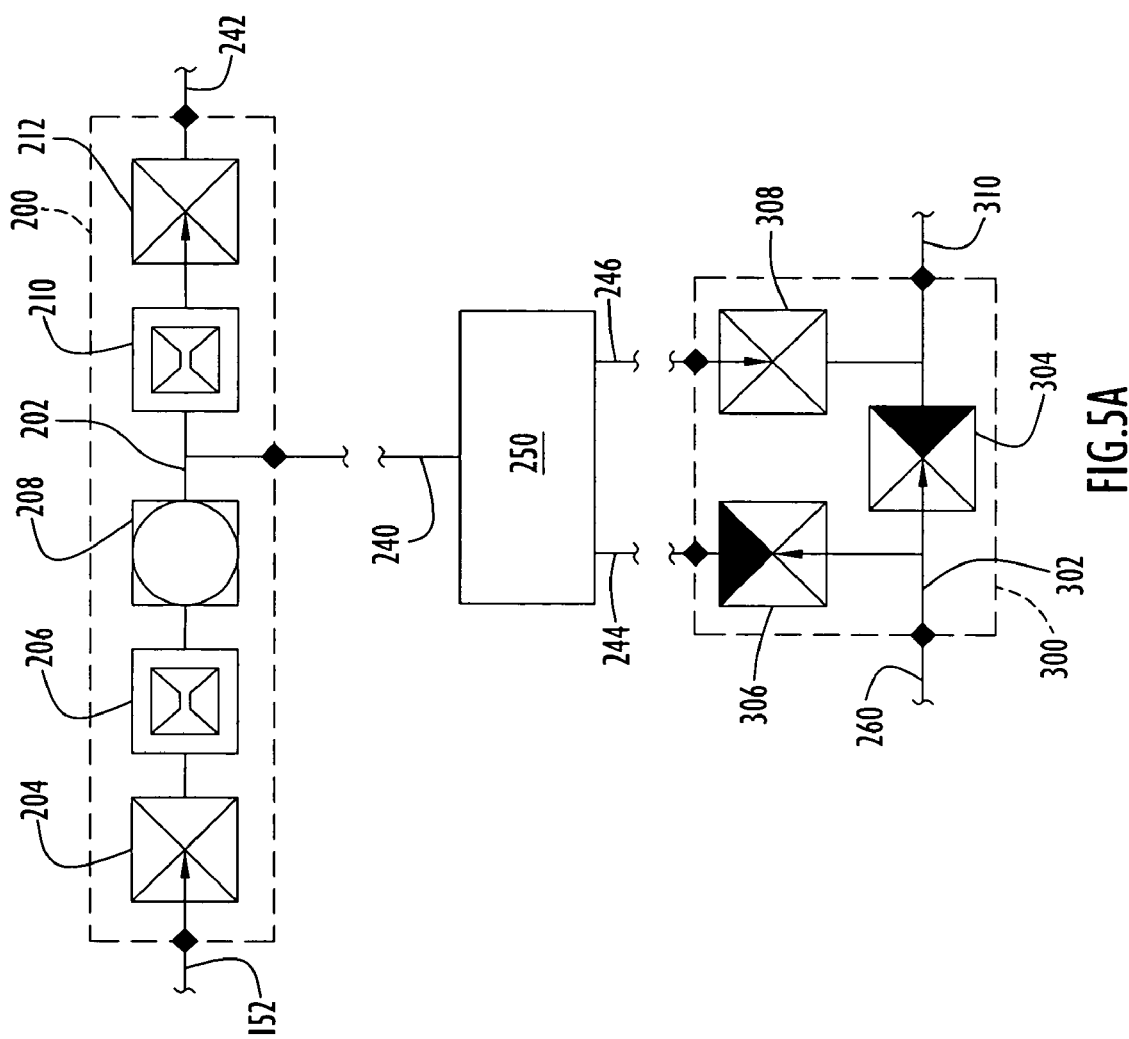
FIGS. 5A–5E depict schematic views of another fluid distribution system in accordance with the present invention and including a fluid pressurization block and a valve switch block, each having a plurality of MEMS components, in fluid communication with a chemical storage tank and a fluid delivery line.

In another embodiment of the present invention, a system is provided for receiving a chemical fluid from a fluid processor located upstream of the system and delivering the fluid at a precise pressure to a delivery site. Referring to FIG. 5A, a chemical distribution system includes a MEMS system block 200 that receives a pressurization fluid (e.g., helium) from a pressurization source (e.g., a pressurization tank) via a pressurization line 152. The second system block 200 is designed to pressurize a storage tank 250 (e.g., an intermediate or "day" tank) containing a chemical for distribution to a delivery site (e.g., a semiconductor processing tool). The second system block 200 includes a number of MEMS components arranged in-line along a channel 202 disposed in the system block and extending between an inlet port that is in fluid communication with the pressurization line 152 and a vacuum/exhaust port that is in fluid communication with a vacuum/exhaust line 242. The vacuum/exhaust line 242 is connected to a fluid collection site (not shown).

Disposed along the main line of the channel 202 are the following MEMS components (in sequential order from the pressurization fluid inlet side of the block): an inlet shut-off valve 204, a first proportional valve 206, a pressure sensor 208, a second proportional valve 210 and an outlet shut-off valve 212. The MEMS proportional valves 206 and 210 are preferably membrane based and are well known in the art and commercially available from, e.g., Redwood Microsystems, Inc. (Menlo Park, Calif.). While the arrangement of these MEMS components are all disposed on a single block, it is noted that, alternatively, these components may be disposed on any suitable number of blocks in fluid communication with each other. Any one or more processors are employed in any conventional or other suitable manner to effect opening and closing of the shut-off valves 204 and 212, to manipulate of one or both of the proportional valves 206 and 210 to modify fluid pressure within the system block 200 in response to measured pressures within the system block 200 via pressure sensor 208.

The inlet and outlet shut-off valves 204 and 212 are similar to the shut-off valve described above for FIG. 1 and are implemented along channel 202 in a forward orientation with respect to the normal flow of pressurized fluid through each valve (as indicated by the arrows depicted in FIG. 5A for each valve 204, 212). Channel 202 further includes a branched section that extends to an outlet port of system block 200. The outlet port of the system block 200 is in fluid communication with a non-MEMS pressurization line 240 (e.g., metal or plastic tubing) that is connected to a pressurization inlet of the tank 250.

A third system block 300 includes an inlet port that is in fluid communication with a fluid delivery line 260 that supplies fluid from an upstream fluid processor (not shown). A main flow channel 302 is disposed within and extends between the inlet port and an outlet port of the third system block 300. The main flow channel 302 includes a first shut-off valve 304 implemented on the channel in a forward orientation with respect to the normal flow of fluid from the inlet port and through the valve (as indicated by the arrow depicted in FIG. 5A for valve 304). The outlet port of block 300 is in fluid communication with a non-MEMS fluid delivery line 310 that is connected to a delivery site (e.g., a semiconductor processing tool).

The main flow channel 302 further includes a first branched section extending from the channel at a location upstream of valve 304 and a second branched section extending from the channel at a location downstream of valve 304. The first branched section includes a second shut-off valve 306 and extends to a transfer port of block 300 that is in fluid communication with a fluid transfer line 244 connected with tank 250. Valve 306 is implemented on the first branched section in a forward orientation with respect to the normal flow of fluid supplied by delivery line 122 into and through the valve (as indicated by the arrow depicted in FIG. 5A for valve 306). Thus, the third system block facilitates the supply of fluid from the upstream fluid processor to the tank 250 via the first system block 100, delivery line 122, and the third system block 300.

The second branched section of channel 302 includes a third shut-off valve 308 and extends to a fluid receiving port of block 300 that is in fluid communication with a fluid supply line 246 connected with tank 250. Valve 308 is implemented on the second branched section in a forward orientation with respect to the normal flow of fluid supplied by tank 250 into and through the valve (as indicated by the arrow depicted in FIG. 5A for valve 308).

Operation of the system described above is now described with reference to FIGS. 5A–5E. The pressure of the pressurization fluid is precisely controlled via system block 200, which in turn precisely controls the pressure and flow rate of chemical fluid from tank 250 through system block 300 and into delivery line 310. In normal chemical delivery mode, shut-off valves 204 and 212 in system block 200 are open, and proportional valves 206 and 210 are also maintained at a set open position while the pressure of the pressurization fluid is monitored via pressure sensor 208. If the measured pressure at the pressure sensor 208 drops below a minimum threshold value or range of values, proportional valve 206 is further opened to increase the flow and pressure of pressurization fluid within block 200. Similarly, when the measured pressure exceeds an upper threshold value or range of values, proportional valve 210 is opened just enough to relieve excess pressure and until the measured pressure falls within a desired pressure range. Optionally, proportional valves 206 and 210 and/or shut off valve 212 may be independently and/or simultaneously controlled to either increase or decrease pressure within system block 200 as desired.

Figure 5B:
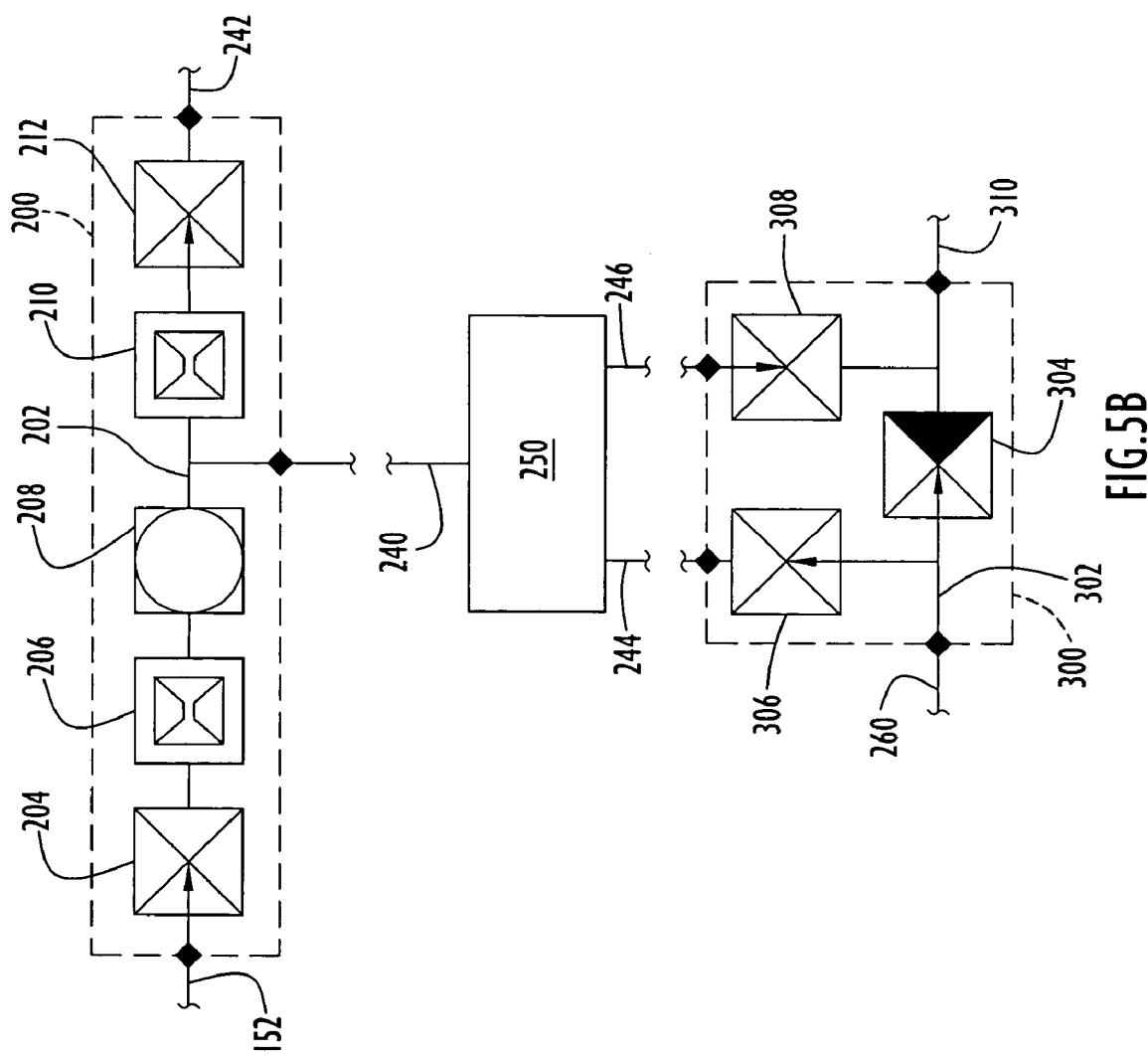
Figure 5C:
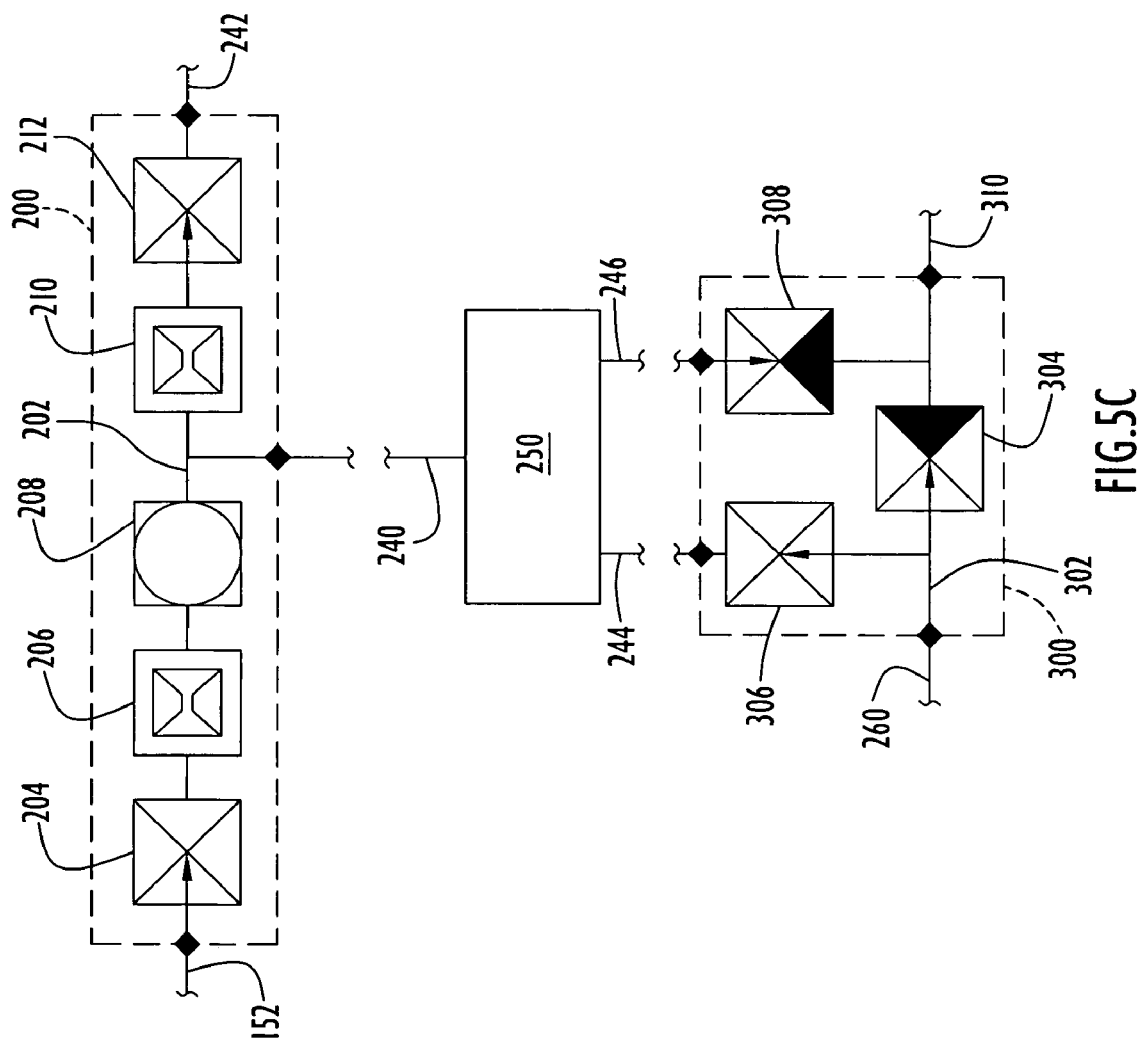
Figure 5D:
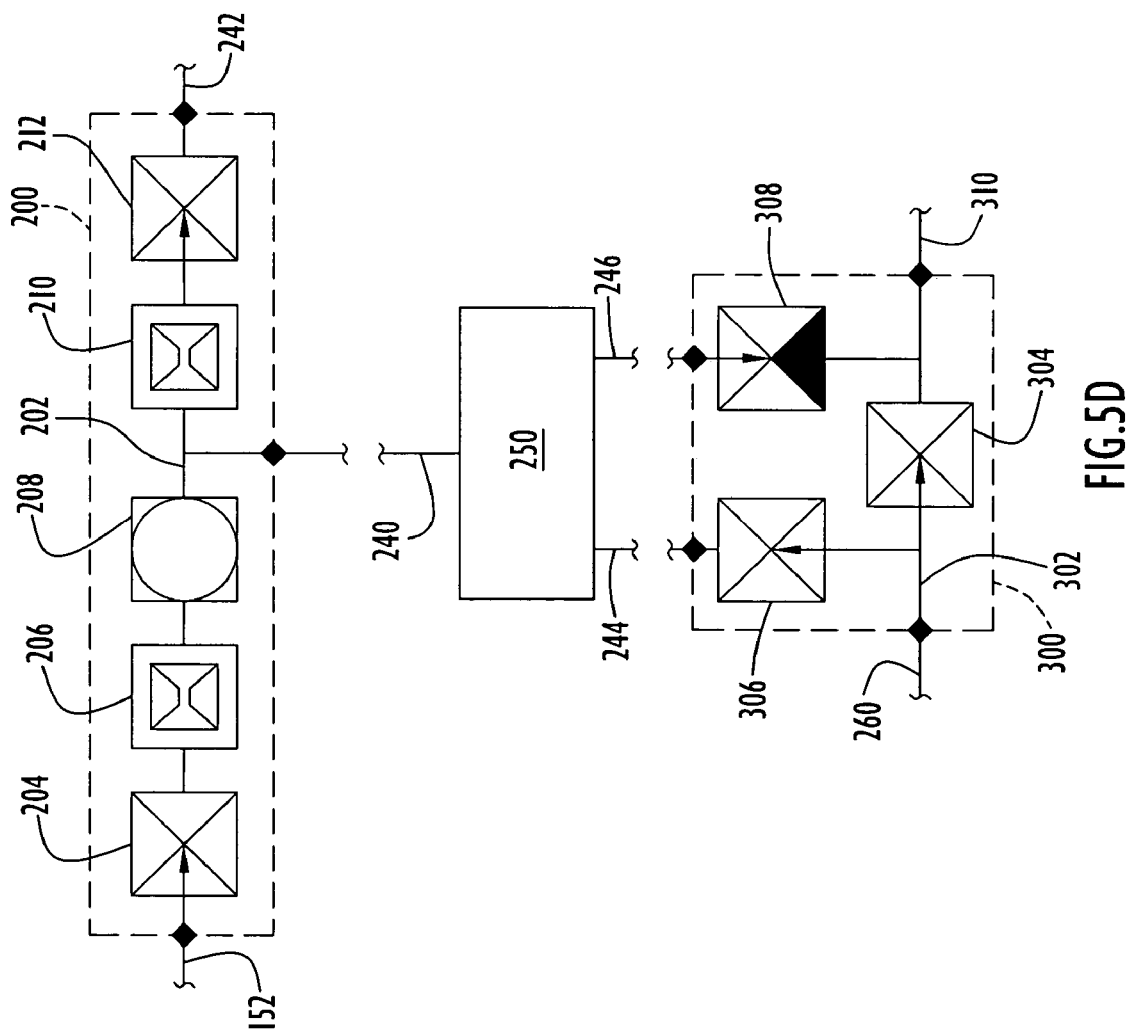
Figure 5E:
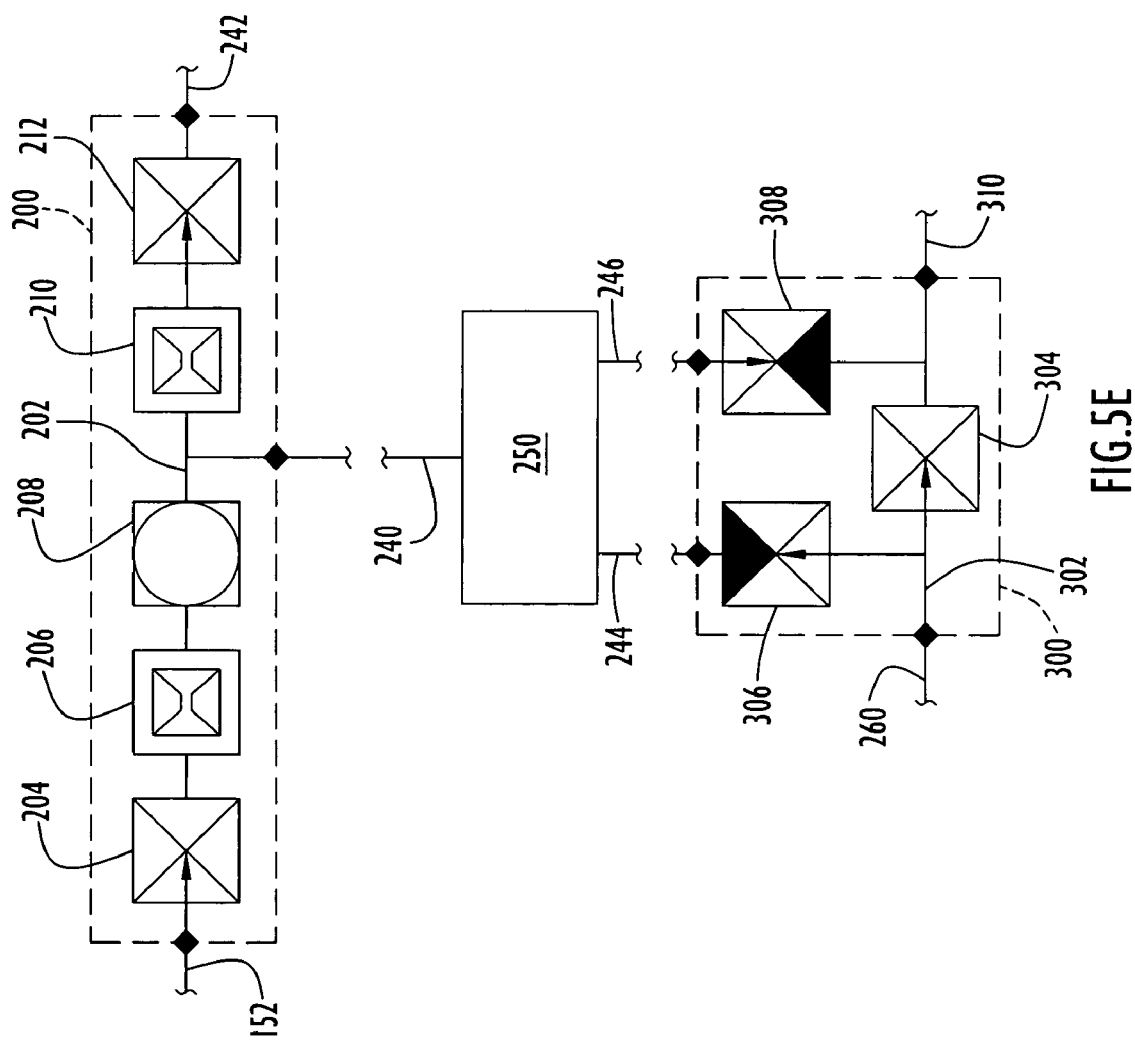

System block 300 effectively serves as a shutoff switch to facilitate filling of tank 250 with fluid from the upstream fluid processor while selectively permitting fluid to flow from one or both of the upstream fluid processor and the tank 250. Referring to FIG. 5A, valves 304 and 306 are closed while valve 308 is open. This configuration prevents chemical fluid flowing from the upstream fluid processor to both the tank 250 and delivery line 310, while permitting fluid to flow from tank 250 into system block 300 and delivery line 310. In the configuration of FIG. 5B, valves 306 and 308 are open while valve 304 is closed so as to permit filling of tank 250 from the upstream fluid processor while simultaneously delivery fluid from tank 250 to delivery line 310. The configuration of FIG. 5C shows valve 306 open and valves 304 and 308 closed, thus facilitating the filling of tank 250 from the upstream fluid processor while chemical delivery to line 310 is halted. Alternatively, valves 304 and 306 may be open and valve 308 closed, as depicted in FIG. 5D, to facilitate both filling of tank 250 and the flow of fluid to delivery line 310 from the upstream fluid processor. Finally, valves 306 and 308 may be closed and valve 304 open, as depicted in FIG. 5E, to facilitate delivery of fluid from the upstream fluid processor to delivery line 310 while tank 250 is brought offline (e.g., for repair or replacement).

Thus, the system described above and depicted in FIGS. 5A–5E facilitates precise control of the pressurization fluid, via system block 200, which in turn facilitates precise control of the chemical fluid flow rate and pressure during system operation. While the system described in FIGS. 5A–5E utilizes two system blocks, it is noted that all the described MEMS components could alternatively be implemented in a single block. The system is further capable of being integrated with another chemical supply system for delivering chemical fluid to tank 250, with system block 300 providing multiple flow switching options as noted above. The orientation of MEMS shut-off valves in system block 300 provides adequate sealing of fluids for each of the switching options depicted in FIGS. 5A–5E. Optionally, it is noted that any number of redundant valves and/or combined or dual opposing shut-off valve configurations similar to the design described above and depicted in FIGS. 2a and 2b may be implemented for any of the shut-off valves in system blocks 200 and 300.

Figure 6:
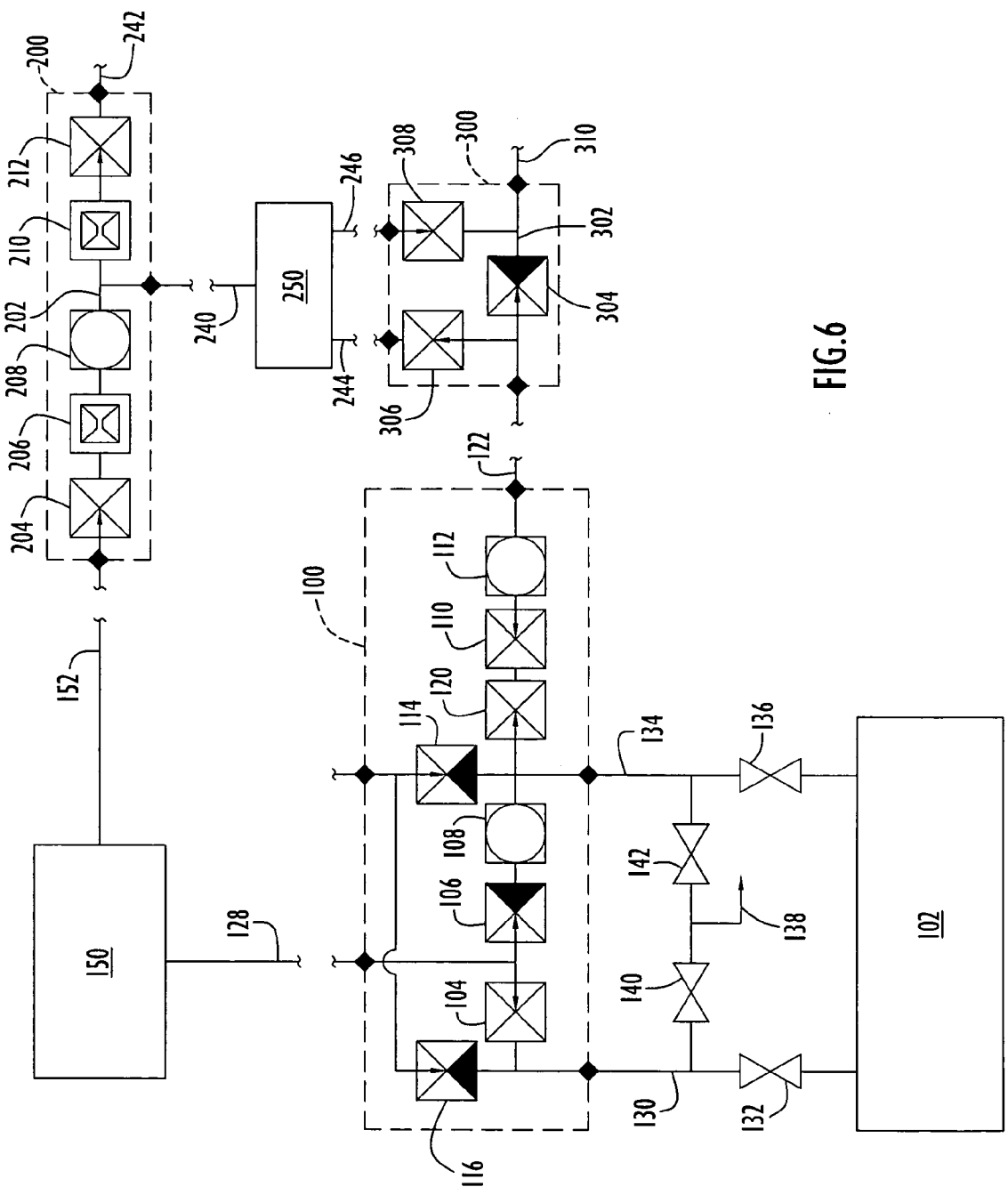
FIG. 6 depicts a schematic view of the integration of the systems depicted in FIGS. 4B and 5A.

A further embodiment of the present invention combines the systems of FIGS. 4B and 5A, where the system of FIG. 4B serves as the upstream fluid processor for the system of FIG. 5A. Referring to FIG. 6, the outlet port of system block 100 is in fluid communication with the inlet port of system block 300 via non-MEMS fluid delivery line 122. In addition, pressurization lines 128 and 152 of system blocks 100 and 200 are each connected to a source of fluid pressurization 150 (e.g., a helium tank). The operation of each system block is substantially similar to that previous described above for each individual system. Thus, the system of FIG. 6 facilitates an uninterrupted supply of a chemical to a delivery site. For example, in a primer fluid delivery mode, the chemical is supplied from tank 250 while being periodically replenished (as described above) by the main tank 102. When the main tank 102 needs to be refilled or replaced with a new tank, the chemical delivery mode may be continued by supplying fluid from tank 250 while tank 102 temporarily goes offline (i.e., by appropriate switching of the shut-off valves in system block 300). Replacement and/or refilling of tank 250 may include evacuation, purging and/or cleaning of the distribution lines in system block 100, which can be easily achieved in the manner described above. It is further noted that all of the MEMS components described above and depicted in FIG. 6 could be implemented into a single block, depending upon system requirements.

In yet another embodiment of the present invention, a MEMS system block includes a mass flow controller with at least one integrated purge or flush line to facilitate cleaning of the mass flow controller at selected periods during system operation. As previously noted, the use of MEMS mass flow controllers in distribution systems can create clogging problems, particularly when there is stagnant chemical within the flow controller, due to the extremely small channel dimensions and internal volumes associated with MEMS. The integration of a purge or flush line with the MEMS mass flow controller prevents stagnant chemicals from lingering inside the micro-channels of the mass flow controller, thus improving the reliability and performance of the mass flow controller without having to increase the dimensions (and thus internal volume) of the flow channels within the system block.

Figure 7A:
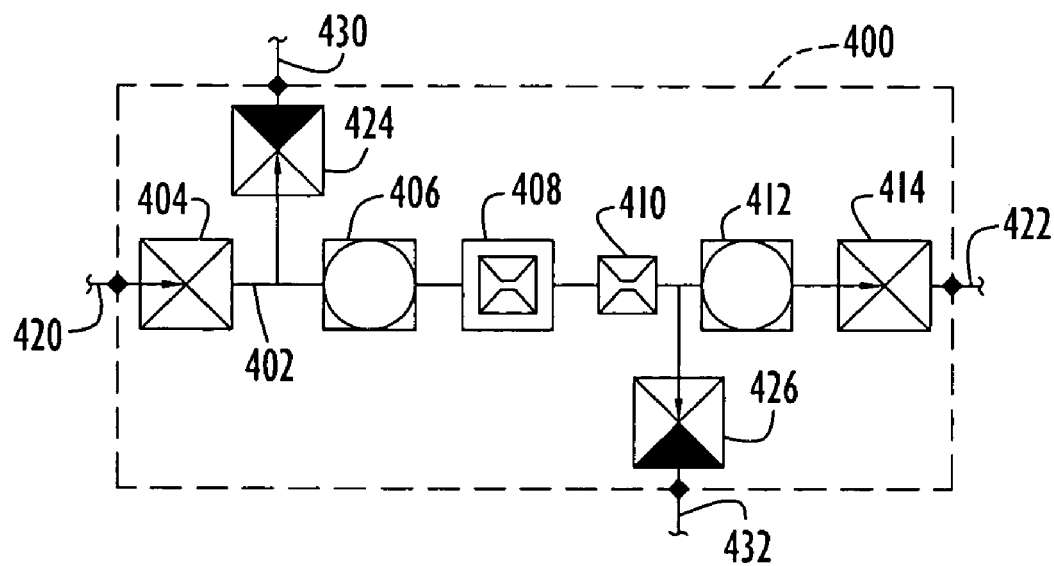
FIGS. 7A and 7B depict a schematic view of a mass flow controller system block employing MEMS components in accordance with the present invention.
Figure 7B:
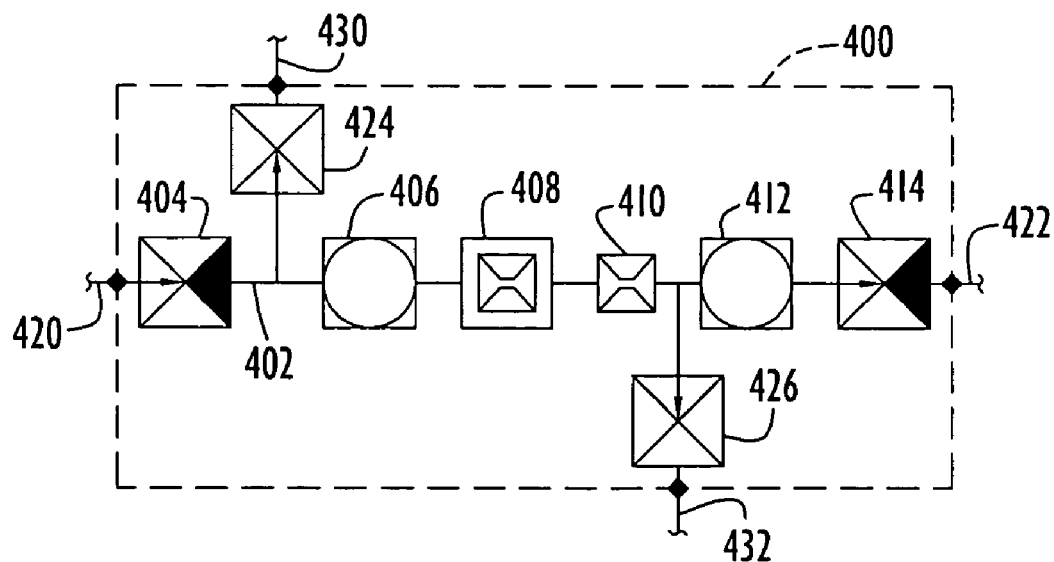

A mass flow controller MEMS system block 400 is schematically depicted in FIGS. 7A and 7B and includes a flush/purge line to remove residual chemicals from the system block during periods of non-use (i.e., non-flow of chemical fluid through the block). Specifically system block 400 includes the following MEMS components implemented in-line and in series along a main flow channel 402 disposed in the block (in sequential order from an inlet port to an outlet port of the main channel 402): a first shut-off valve 404 disposed near the main channel inlet port, a first combined pressure/temperature sensor 406, a proportional valve 408, a restricted flow orifice 410, a second pressure sensor 412 and a second shut-off valve 414 disposed near the main channel outlet port. The inlet port of the main channel 402 is in fluid communication with a non-MEMS chemical supply line 420 to facilitate the flow of chemical to the system block 400 from an upstream fluid processor. Similarly, the outlet port of the main channel 402 is in fluid communication with a non-MEMS delivery line 422 for supplying chemical to a delivery site (e.g., a semiconductor processing tool). All of the shut-off valves of block 400 are similar to the shut-off valve described above and depicted in FIG. 1. The MEMS proportional valve 408 pressure/temperature and pressure sensors 406, 412 are well known in the art and similar to those described above for the previous embodiments. Any one or more conventional or other suitable processors are utilized to effect control (i.e., opening and closing) of the valves based upon pressure and temperature measurements obtained by the sensors and at selected periods when it is desired to switch from a chemical delivery mode to a purge/flush mode. While the MEMS mass flow controller depicted in FIGS. 7A and 7B utilizes pressure and temperature measurements to control fluid flow, it is noted that any other suitable mass flow controller may also be implemented within the system block which utilizes one or more other physical parameters to control fluid flow (e.g., ultrasound, thermoconductivity, etc.).

Both the first and second shut-off valves 404 and 414 are implemented on channel 402 in a forward orientation with respect to the normal flow direction of fluid from the inlet port to the outlet port of the main channel (as indicated by the arrows depicted in FIG. 7A for valves 404 and 414).

The main channel 402 further includes a pair of branched sections, the first branched section disposed at a location between the first shut-off valve 404 and the first pressure/temperature sensor 406 and the second branched section disposed at a location between the orifice 410 and the second pressure sensor 412. The first branched section extends to an inlet port that is in fluid communication with a non-MEMS purge/flush supply line 430. The supply line 430 is connected to a purge/flush supply (e.g., a supply tank). Similarly, the second branched section extends to an outlet port that is in fluid communication with a non-MEMS collection line 432 that connects with a collection site (e.g., a collection tank). Optionally, collection line 432 may include a vacuum pump to facilitate removal of fluid from the block 400 during the purge/flush mode as described below.

A third shut-off valve 424 is implemented on the first branched section in a reverse orientation with respect to the normal flow direction of purge/flush fluid supplied from supply line 430 to the system block 400 (as indicated by the arrow depicted in FIG. 7A for valve 424). A fourth shut-off valve 426 is implemented on the second branched section in a forward orientation with respect to the normal flow direction of purge/flush fluid flowing through the system block 400 to collection line 432 (as indicated by the arrow depicted in FIG. 7A for valve 426).

During the chemical delivery mode of system operation, as depicted in FIG. 7A, shut-off valves 424 and 426 are closed to prevent flow of purge/flush fluid from entering the main flow channel 402 of the system block 400, while shut-off valves 404 and 414 are open to permit flow of chemical fluid through the main flow channel 402. The pressure of purge/flush fluid in line 430 is maintained at no greater than the pressure of fluid flowing through the main channel 402 of the system block 400 to prevent leakage of purge/flush fluid through valve 424. The proportional valve 410 is calibrated to various open/closed positions to achieve desired pressure differentials between the first pressure/temperature sensor 406 and the second pressure sensor 412 at a given measured temperature so as to achieve a precise chemical flow rate through the system block 400 and to the delivery site.

During periods when chemical delivery to the delivery site is to be halted and the purge/flush mode is implemented, as depicted in FIG. 7B, shut-off valves 404 and 414 are closed to prevent flow of chemicals into or out of the system block through the main channel 402. Shut-off valves 424 and 426 are opened to permit a purge/flush fluid (e.g., nitrogen) to flow through the main channel portions of the system block 400. The fluid in line 420 is maintained at the same or greater pressure than the purge/flush fluid flowing through the main channel 402 in the system block 400 to prevent leakage of purge/flush fluid from valve 404 into line 420. The flowing purge/flush fluid removes residual chemical residing in the main channel 402 into collection line 432, thus substantially minimizing or preventing blockages in the main channel as well as MEMS components disposed along the main channel.

Thus, the system block 400 provides a reliable MEMS mass flow controller that integrates a purge/flush line to reduce or eliminate potential blockages in the MEMS components. Switching between a chemical delivery mode and a system purge/flush mode is achieved quickly and easily, where the mass flow controller components can be quickly isolated within the block by the shut-off valves 404 and 414. System block 400 may also be modified to include any number of suitable redundant shut-off valves and/or shut-off valve combinations as described above to enhance system performance and minimize potential leakage through any of the valves. If necessary, additional purge/flush lines may also be easily added within the system block without significant increase in the system block dimensions and internal volume.

Figure 8:
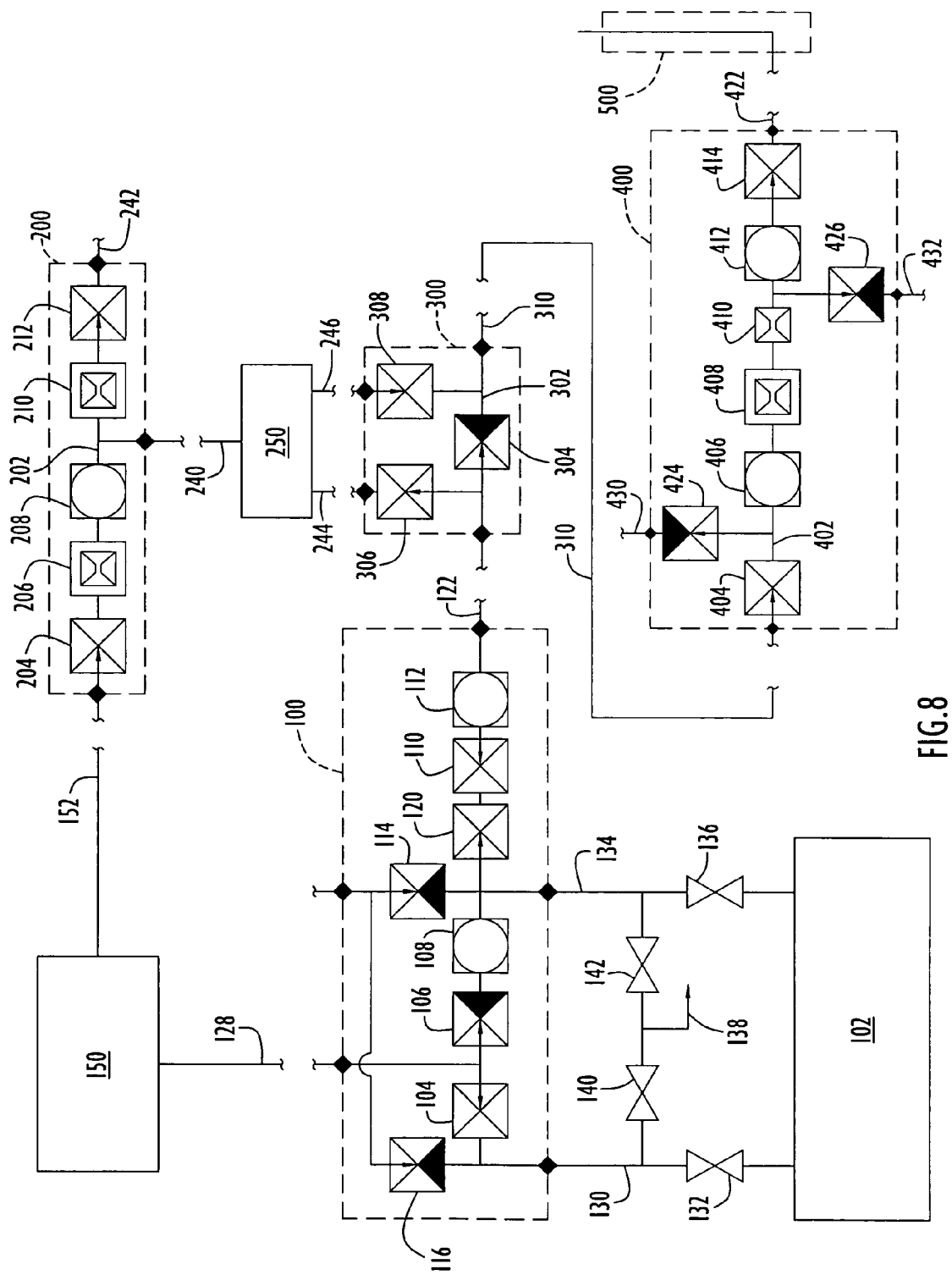
FIG. 8 depicts a schematic view of the integration of the systems of FIGS. 6 and 7.

The system block 400 of FIGS. 7A and 7B can be combined with the system of FIG. 6 to achieve a complex, high purity chemical delivery system that provides precise pressure control and fluid flow to a delivery site. Referring to FIG. 8, a system embodiment is schematically depicted, where system block 400 is implemented within the system depicted in FIG. 6 by connecting fluid delivery line 310, which is in fluid communication with an outlet port of system block 300, to the inlet port of system block 400 (i.e., at the location immediately upstream from valve 404). The delivery line 422 of block 400 is connected with a semiconductor processing tool 500.

Thus, the many embodiments described above and depicted in the figures facilitate the combination of MEMS components in a complex distribution system to reliably deliver high purity fluids for a semiconductor fabrication or other process while minimizing the potential for contamination of process fluid being delivered by the MEMS components. The MEMS components may be integrated on a single block or, alternatively, a plurality of blocks in fluid communication with each other and preferably arranged in functional groups (e.g., pressurization groups, flow rate control groups, etc.).

Having described novel microelectromechanical systems for delivering high purity fluids in a chemical delivery system, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A fluid distribution block comprising:
 a pressurization supply channel disposed within the block and extending between a pressurization inlet port to receive a pressurization fluid from a pressurization fluid supply source and a pressurization outlet port to facilitate delivery of the pressurization fluid to a process fluid supply source for pressurizing a process fluid disposed within the process fluid supply source;
 a process delivery channel disposed within the block and extending between a process inlet port to receive fluid from the process fluid supply source and a process outlet port to deliver process fluid from the block to a delivery site;
 a purge channel disposed within the block and extending between a purge inlet port to receive a purge fluid from a purge fluid supply source and a purge outlet port to deliver fluid to a purge fluid collection site; and
 a plurality of valves at least partially formed within the block;
 wherein the pressurization supply channel, the process delivery channel and the purge channel are in fluid communication with each other and at least one valve is in fluid communication with each channel to facilitate selective isolation of each channel with respect to the other channels within the block.

2. The fluid distribution block of claim 1, wherein the cross-sectional dimensions of channels within the block are no greater than about 200 micrometers.

3. The fluid distribution block of claim 1, wherein the at least one valve disposed proximate the process outlet port.

4. The fluid distriution block of claim 3, further comprising:
 a first pressure sensor at least partially formed within the block and in fluid communication with the process delivery channel at a location upstream of the shut-off valve; and a second pressure sensor at least partially formed within the block and in fluid communication with the process delivery channel at a location downstream of the shut-off valve.

5. The fluid distribution block of claim 3, wherein the shut-off valve includes a sealing member that selectively provides an asymmetric fluid seal such that, when a pressure differential is equally applied across the valve in a first direction from the process inlet port to the process outlet port and in a second direction that opposes the first direction, a fluid leakage rate across the sealing member is higher when fluid flows in the first direction in comparison to when fluid flows in the second direction.

6. The fluid distribution block of claim 5, wherein the at least one valve in fluid communication with the process delivery channel further includes a second shut-off valve disposed upstream and proximate with the first shut-off valve.

7. The fluid distribution block of claim 6, wherein the second shut-off valve includes a sealing member that selectively provides an asymmetric fluid seal such that, when a pressure differential is equally applied across the valve in the first direction and in the opposing second direction, a fluid leakage rate across the sealing member is higher when fluid flows in the first direction in comparison to when fluid in the second direction.

8. The fluid distribution block of claim 6, wherein the second shut-off valve includes a sealing member that selectively provides an asymmetric fluid seal such that, when a pressure differential is equally applied across the valve in the first direction and in the opposing second direction, a fluid leakage rate across the sealing member is higher when fluid flows in the second direction in comparison to when fluid flows in the first direction.

9. The fluid distribution block of claim 1, wherein portions of the block and the valves are formed of silicon.

10. A fluid distribution system comprising:
a process fluid supply source including a process fluid;
a first process block in fluid communication with the fluid supply source, the first process block comprising:
    a pressurization supply channel disposed within the first process block and extending between a pressurization inlet port to receive a pressurization fluid from a pressurization fluid supply source and a pressurization outlet port to facilitate delivery of the pressurization fluid to the process fluid supply source for pressurizing the process fluid disposed within the process fluid supply source;
    a process delivery channel disposed within the first process block and extending between a process inlet port to receive fluid from the process fluid supply source and a process outlet port to deliver process fluid from the first process block to a first delivery line;
    a purge channel disposed within the first process block and extending between a purge inlet port to receive a purge fluid from a purge fluid supply source and a purge outlet port to deliver fluid to a purge fluid collection site; and
    a plurality of valves at least partially formed within the first process block;
    wherein the pressurization supply channel, the process delivery channel and the purge channel are in fluid communication with each other and at least one valve is in fluid communication with each channel to facilitate selective isolation of each channel with respect to the other channels within the first process block.

11. The system of claim 10, further comprising:
a secondary process fluid supply source;
a second block in fluid communication with the pressurization fluid supply source and the secondary process fluid supply source, the second block comprising:
    a pressurization channel disposed within the second block, a pressure sensor at least partially formed within the second block and in fluid communication with the pressurization channel, and a plurality of valves at least partially formed in the second block and in fluid communication with the pressurization channel to facilitate pressurizing of the pressurization fluid entering the pressurization channel from the pressurization supply source to a selected pressure prior to delivery of the pressurization fluid to the secondary process fluid supply source; and
a third block including a network of delivery channels disposed within the third block and a plurality of valves at least partially formed within the third block and in fluid communication with the network of delivery channels, the network of delivery channels being in fluid communication with each of the process fluid supply source and the secondary process fluid supply source to facilitate a supply of the process fluid from at least one of the fluid supply source and the secondary fluid supply source to a second delivery line.

12. The system of claim 11, further comprising:
a fourth block in fluid communication with the second delivery line, the fourth block comprising:
    a main flow channel disposed within the fourth block;
    a first shut-off valve at least partially formed within the fourth block and in fluid communication with the main flow channel to selectively control input of a fluid into the system from the second delivery line;
    a second shut-off valve at least partially formed within the fourth block and in fluid communication with the main flow channel to selectively control output of the fluid from the system to a delivery site;
    a flow meter comprising:
        a sensor at least partially formed within the fourth block and in fluid communication with the main flow channel and disposed between the first and second shut-off valves, the sensor measuring a physical property of the fluid flowing through the main flow path; and
        a control valve at least partially formed within the fourth block and in fluid communication with the main flow channel and disposed between the first and second shut-off valves to selectively control the flow rate of the fluid flowing through the main flow channel based upon measurements of the sensor; and
    a purge inlet flow channel disposed within the fourth block and in fluid communication with the main flow channel and a purge inlet port to facilitate delivery of a purge fluid from a second purge fluid supply source to the purge inlet flow path, the purge fluid inlet flow channel being disposed between the first shut-off valve and the flow meter and further including a third shut-off valve to selectively control the flow of purge fluid from the second purge fluid supply source into the purge inlet flow channel; and
    a purge outlet flow channel disposed within the fourth block and in fluid communication with the main flow path and a purge outlet port to facilitate delivery of a purge fluid from the purge outlet flow channel to a second purge fluid collection site, the purge outlet flow channel being disposed between the flow meter and the second shut-off valve and further including a fourth shut-off valve to selectively control the flow of purge fluid from the purge outlet flow channel to the second purge fluid collection site.

13. A method of operating a combined flow meter and internal purge system, the system including a main flow path, a first shut-off valve in fluid communication with the main flow path, a second shut-off valve in fluid communication with the main flow path, a flow meter supposed between the first and second shut-off valves, the flow meter including a sensor and a control valve in fluid communication with the main flow path, and a purge delivery line including a purge inlet flow path in fluid communication with the main flow path and a purge inlet port and a purge outlet flow path in fluid communication with the main flow path and a purge outlet port, the purge fluid inlet flow path including a third shut-off valve and being disposed between the first shut-off valve and the flow meter, and the purge outlet flow path including a fourth shut-off valve and being disposed between the flow meter and the second shut-off valve, the method comprising:
    (a) facilitating fluid communication between the main flow path and a process fluid supply source;
    (b) opening the first and second shut-off valves, while the third and fourth shut-off valves are closed, to facilitate the flow of a process fluid through the main flow path from the process fluid supply source;
    (c) measuring a physical property of the process fluid flowing through the main flow path with the sensor and manipulating the control valve to control the flow rate of the process fluid based upon the measured physical property;
    (d) selectively closing the first and second shut-off valves to prevent the flow of the process fluid through the main flow path;
    (e) facilitating fluid communication between the purge inlet port and a purge fluid supply source and the purge outlet port and a purge fluid collection source; and
    (f) opening the third and fourth shut-off valves, while the first and second shut-off valves are closed, to facilitate a flow of purge fluid from the purge fluid collection source, through the purge fluid inlet flow path, the main flow path and the purge fluid outlet path to the purge fluid collection site.

14. The method of claim 13, wherein each of the main flow path, the shut-off valves, the flow meter and the purge fluid delivery line are at least partially formed within a block.

15. The method of claim 14, wherein the main flow path, the purge inlet flow path and purge outlet flow path comprise channels disposed within the block, and the cross-sectional dimensions of the channels are no greater than about 200 micrometers.

16. The method of claim 14, wherein the block is at least partially formed of silicon.

17. The method of claim 14, wherein each of the first, second, third and fourth shut-off valves includes a first channel in fluid communication with a second channel and a sealing member disposed between the first and second channels to selectively provide an asymmetric fluidic seal between the first and second channels such that, when a pressure differential is equally applied in opposing directions between the first and second channels, a fluid leakage rate across the sealing member is higher when fluidic pressure within the second channel is greater than fluidic pressure in the first channel in comparison to when fluidic pressure in the first channel is greater than fluidic pressure in the second channel.

18. A method of delivering a process fluid from a storage location to a delivery site, the method comprising:
    (a) providing a first process block in fluid communication with a fluid supply source, the first process block including a pressurization supply channel disposed within the first process block and extending between a pressurization inlet port and a pressurization outlet port, a process delivery channel disposed within the first process block and extending between a process inlet port and a process outlet port, a purge channel disposed within the first process block and extending between a purge inlet port and a purge outlet port, and a plurality of valves at least partially formed within the first process block, wherein the pressurization supply channel, the process delivery channel and the purge channel are all in fluid communication with each other and at least one valve is in fluid communication and associated with each channel;
    (b) facilitating fluid communication between the pressurization inlet port and a pressurization fluid supply source and between the pressurization outlet port and the process fluid supply source;
    (c) pressurizing process fluid disposed within the process fluid supply source by flowing pressurization fluid from the pressurization fluid supply source through the pressurization supply channel and into the process fluid supply source;
    (d) facilitating fluid communication between the process inlet port and the process fluid supply source and between the process outlet port and a first delivery line;
    (e) flowing process fluid from the process fluid supply source through the process delivery channel and into the first delivery line;
    (f) facilitating fluid communication between the purge inlet port and a purge fluid supply source and between the purge outlet port and a purge fluid collection site; and
    (g) manipulating at least one valve associated with each channel so as to selectively isolate at least one of the pressurization supply channel, the process delivery channel and the purge channel from the other channels.

19. The method of claim 18, wherein the manipulation step (f) includes closing at least one valve disposed proximate the process outlet port and at least one other valve proximate the pressurization inlet port, and opening at least one valve disposed proximate the purge inlet port to facilitate the flow of a purge fluid from the purge fluid supply source, through the purge channel and at least portions of the process delivery channel to the purge collection site.

20. The method of claim 18, further comprising:
    (h) providing a secondary process fluid supply source;
    (i) providing a second block in fluid communication with the pressurization fluid supply source and the secondary process fluid supply source, the second block including a pressurization channel disposed within the second block, a pressure sensor at least partially formed within the second block and in fluid communication with the pressurization channel, and a plurality of valves at least partially formed in the second block and in fluid communication with the pressurization channel;
    (j) pressurizing the pressurization fluid entering the pressurization channel from the pressurization supply source to a selected pressure;

(k) delivering the pressurization fluid to the secondary process fluid supply source at the selected pressure;

(l) providing a third block including a network of delivery channels disposed within the third block and a plurality of valves at least partially formed within the third block and in fluid communication with the network of delivery channels, the network of delivery channels being in fluid communication with each of the process fluid supply source and the secondary process fluid supply source;

(m) supplying the process fluid, via the third block, from at least one of the fluid supply source and the secondary fluid supply source to a second delivery line.

21. The method of claim 20, further comprising:

(n) providing a fourth block including a main flow channel disposed within the fourth block and in fluid communication with the second delivery line, a first shut-off valve at least partially formed within the fourth block and in fluid communication with the main flow channel, a second shut-off valve at least partially formed within the fourth block and in fluid communication with the main flow channel, a flow meter including a sensor and a control valve, and a purge delivery line including a purge inlet flow channel in fluid communication with the main flow channel and a purge inlet port and a purge outlet flow channel in fluid communication with the main flow channel and a purge outlet port, the purge fluid inlet flow channel including a third shut-off valve and being disposed between the first shut-off valve and the flow meter, and the purge outlet flow channel including a fourth shut-off valve and being disposed between the flow meter and the second shut-off valve;

(o) opening the first and second shut-off valves, while the third and fourth shut-off valves are closed, to facilitate the flow of the process fluid through the main flow channel from the second delivery line;

(p) measuring a physical property of the process fluid flowing through the main flow channel with the sensor and manipulating the control valve to control the flow rate of the process fluid based upon the measured physical property;

(q) selectively closing the first and second shut-off valves to prevent the flow of the process fluid through the main flow channel;

(r) facilitating fluid communication between the purge inlet port and a purge fluid supply source and the purge outlet port and a purge fluid collection source; and (s) opening the third and fourth shut-off valves, while the first and second shut-off valves are closed, to facilitate a flow of purge fluid from the purge fluid collection source, through the purge fluid inlet flow channel, the main flow channel and the purge fluid outlet channel to the purge fluid collection site.

22. A semiconductor processing fluid distribution system comprising:

a semiconductor processing tool; and a block including at least one channel formed within the block and a plurality of valves at least partially formed within the block and in fluid communication with the at least one channel, the at least one channel including:

a pressurization supply flow path to deliver a pressurization fluid from a pressurization fluid supply source to a process fluid supply source; and a purge floe path to deliver a purge fluid from a purge fluid supply source into and through portions of the at least one channel;

wherein the block supplies a process fluid originating from the process fluid supply source to the semiconductor processing tool.

23. A semiconductor processing fluid distribution system comprising:

a semiconductor processing tool; and a block including at least one channel formed within the block and a flow meter comprising a pressure sensor and a control valve at least partially formed within the block and in fluid communication with the at least one channel, the at least one channel including an inlet purge channel disposed upstream of the pressure sensor and the control valve, and an outlet purge channel disposed downstream of the pressure sensor and the control valve, the inlet purge channel is in fluid communication with a purge fluid supply source to facilitate delivery of a purge fluid from the purge fluid supply source and through the at least one channel between the inlet and outlet purge channels;

wherein the at least one channel receives a process fluid from a process fluid supply source and the flow meter selectively controls the flow rate of the process fluid for delivery to the semiconductor processing tool.

24. A method of providing a process fluid to a semiconductor processing tool, the method comprising: fluid distribution system comprising:

(a) providing a block including at least one channel formed within the block and a plurality of valves at least partially formed within the block and in fluid communication with the at least one channel;

(b) pressurizing a process fluid disposed within a process fluid supply source by delivering a pressurization fluid from a pressurization fluid supply source to the process fluid supply source via a pressurization flow path of the at least one channel;

(c) purging portions of the at least one channel by delivering a purge fluid from a purge fluid supply source into and through the portions of the at least one channel via a purge flow path of the at least one channel; and (d) supplying a process fluid originating from the process fluid supply source to the semiconductor processing tool via the block.

25. A method of providing a process fluid to a semiconductor processing tool, the method comprising: fluid distribution system comprising:

(a) providing a block including at least one channel formed within the block and a flow meter comprising a pressure sensor and a control valve at least partially formed within the block and in fluid communication with the at least one channel, the at least one channel including an inlet purge channel disposed upstream of the pressure sensor and the control valve, and an outlet purge channel disposed downstream of the pressure sensor and the control valve;

(b) receiving a process fluid from a process fluid supply source into the at least one channel;

(c) controlling the flow rate of the process fluid flowing within the at least one channel for delivery to the semiconductor processing tool via the flow meter; and (d) flowing a purge fluid supplied from a purge fluid supply source through the at least one channel between the inlet and outlet purge channels at selected periods during system operation.

* * * * *

UNITED STATES PATENT AND TRADEMARK OFFICE
CERTIFICATE OF CORRECTION

| | |
|---|---|
| PATENT NO. | : 7,195,026 B2 |
| APPLICATION NO. | : 10/733761 |
| DATED | : March 27, 2007 |
| INVENTOR(S) | : Dmitry Znamensky and Alan Zdunek |

It is certified that error appears in the above-identified patent and that said Letters Patent is hereby corrected as shown below:

In Column 20, claim 3, line 60, replace the words "valve disposed" with the words --valve in fluid communication with the process delivery channel includes a shut-off valve disposed--.

In Column 21, claim 7, line 25, replace the words "when fluid in" with the words --when fluid flows in--.

In Column 23, claim 13, line 10, replace the word "supposed" with --disposed--.

In Column 26, delete claim 25 in its entirety.

Signed and Sealed this

Thirteenth Day of November, 2007

JON W. DUDAS
*Director of the United States Patent and Trademark Office*